United States Patent
Smith et al.

(10) Patent No.: US 10,992,532 B1
(45) Date of Patent: *Apr. 27, 2021

(54) AUTOMATED NETWORK CONFIGURATION CHANGES FOR I/O LOAD REDISTRIBUTION

(71) Applicant: EMC IP Holding Company LLC, Hopkinton, MA (US)

(72) Inventors: Erik P. Smith, Douglas, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,125

(22) Filed: Jan. 15, 2020

(51) Int. Cl.
| | | |
|---|---|---|
| *H04L 12/24* | (2006.01) | |
| *H04L 12/26* | (2006.01) | |
| *H04L 29/08* | (2006.01) | |
| *H04L 12/911* | (2013.01) | |
| *H04L 12/935* | (2013.01) | |

(52) U.S. Cl.
CPC ...... *H04L 41/0886* (2013.01); *H04L 41/0843* (2013.01); *H04L 43/0817* (2013.01); *H04L 43/16* (2013.01); *H04L 67/1097* (2013.01)

(58) Field of Classification Search
CPC ............... H04L 29/06; H04L 29/08072; H04L 29/08981; H04L 41/0806; H04L 41/12; H04L 41/082; H04L 41/0213; H04L 41/22; G06F 8/65; G06F 9/4416
See application file for complete search history.

(56) References Cited

U.S. PATENT DOCUMENTS

| | | | | |
|---|---|---|---|---|
| 7,003,527 | B1 * | 2/2006 | Lavallee | H04L 41/0803 |
| 9,058,119 | B1 * | 6/2015 | Ray, III | G06F 3/061 |
| 10,148,483 | B1 | 12/2018 | Lippitt et al. | |
| 2005/0256972 | A1 * | 11/2005 | Cochran | G06F 11/2071 |
| | | | | 709/245 |
| 2007/0244999 | A1 * | 10/2007 | Hamanaka | H04L 67/1008 |
| | | | | 709/220 |
| 2008/0222381 | A1 * | 9/2008 | Lam | H04L 67/1097 |
| | | | | 711/170 |
| 2020/0081781 | A1 * | 3/2020 | Akutsu | G06F 3/0619 |

* cited by examiner

*Primary Examiner* — Abdullahi E Salad
(74) *Attorney, Agent, or Firm* — Muirhead and Saturnelli, LLC

(57) ABSTRACT

Techniques for determining connectivity may include: defining predetermined configurations, each including a predetermined zoning configuration of a network and selection criteria indicating when to transition into and activate the predetermined configuration; loading the predetermined configurations; activating a first of the predetermined configurations that includes a first predetermined zoning configuration and first selection criteria; receiving current I/O workload and/or performance information for the network; determining whether the current I/O workload and/or performance information for the network matches second selection criteria associated with a second of the predetermined configurations that is different from the first predetermined configuration currently activated; and responsive to determining the current I/O workload and/or performance information matches the second selection criteria, activating the second predetermined configuration that is different from the first predetermined configuration currently activated. The predetermined configurations may configure paths between initiator ports and target ports of the network.

20 Claims, 17 Drawing Sheets

| Config ID 252 | Selection Criteria 254 | Zoning Configuration 256 | Masking Information 258 |
|---|---|---|---|
| Config1 | 262a — Starting configuration<br>262b { B3 utilization (BW) < 60% AND<br>B2 utilization (BW) < 60% AND<br>Active=Config2 | 256a { A2 – B3<br>A3 – B3 | 258a { SGA=LUNs 5, 6, 10<br>TPG=B3<br>IPG=A2, A3 |
| Config 2 | 264a { B3 utilization (BW) ≥ 70% AND<br>Active=Config1<br>264b { B3 utilization (BW) <60% AND<br>B2 utilization (BW) < 60% AND<br>B1 utilization (BW) < 60% AND<br>Active=Config 3 | 256b { A2 – B2<br>A3 – B3 | 265a { SGA=LUNs 5, 6, 10<br>TPG=B2<br>IPG=A2<br>265b { SGA=LUNs 5, 6, 10<br>TPG=B3<br>IPG=A3 |
| Config3 | 263a { B3 utilization (BW) ≥ 70% AND<br>B2 utilization (BW) ≥ 70% AND<br>Active=Config2 | 256c { A1 – B1<br>A2 – B2<br>A3 – B3 | 267a { SGA=LUNs 5, 6, 10<br>TPG=B2<br>IPG=A2<br>267b { SGA=LUNs 5, 6, 10<br>TPG=B3<br>IPG=A3<br>267c { SGA=LUNs 5, 6, 10<br>TPG=B1<br>IPG=A1 |

FIG. 9B

| Config ID 402 | Selection Criteria 404 | Zoning Configuration 406 | Masking Information 408 |
|---|---|---|---|
| Config4 | 410a —— Starting configuration <br><br> 410b { ( (B2 workload - B1 workload ) > MAX DIFF ) AND Active=Config5 | A1-B1 <br> A2-B1 } 406a <br> A2-B2 | SG A=LUNs L1,... 410c <br> TPG=B1 <br> IPG=A1 <br><br> SG B=LUNs L99,... 410d <br> TPG=B1 <br> IPG=A2 <br><br> SG C=LUNs L11,... 410e <br> TPG=B2 <br> IPG=A2 |
| Config 5 | 412a { ( (B1 workload - B2 workload ) > MAX DIFF ) AND Active=Config4 | A1-B1 } 406b <br> A2-B2 | SG A=LUNs L1,... 412c <br> TPG=B1 <br> IPG=A1 <br><br> SG B=LUNs L99,... 412d <br> TPG=B2 <br> IPG=A2 <br><br> SG C=LUNs L11,... 412e <br> TPG=B2 <br> IPG=A2 |

FIG. 12B

AUTOMATED NETWORK CONFIGURATION CHANGES FOR I/O LOAD REDISTRIBUTION

BACKGROUND

Technical Field

This application generally relates to connectivity, and in particular, configuring paths for issuing I/O operations.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith.

Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

An application may execute on a host where the application performs I/O (input/output) operations. The host may be able to transmit the data operation to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

Various embodiments of the techniques herein may include a method, a system and a computer readable medium for determining connectivity. Processing may include defining a plurality of predetermined configurations, wherein each of the plurality of predetermined configurations includes a predetermined zoning configuration of a network and includes selection criteria indicating when to transition into and activate said each predetermined configuration, wherein the network includes an initiator set of one or more initiator ports and a target set of one or more target ports; loading the plurality of predetermined configurations; activating a first of the plurality of predetermined configurations that includes a first predetermined zoning configuration and first selection criteria; receiving current I/O workload and/or performance information for the network; determining whether the current I/O workload and/or performance information for the network matches second selection criteria associated with a second of the plurality of predetermined configurations that is different from the first predetermined configuration currently activated; and responsive to determining the current I/O workload and/or performance information matches the second selection criteria, activating the second predetermined configuration that is different from the first predetermined configuration currently activated.

In at least one embodiment, the network may be a storage area network. The network may include a switch. Loading may include loading a plurality of predetermined zoning configurations of the plurality of predetermined configurations into the switch. Activating the first predetermined configuration may include issuing a first command to the switch to activate the first predetermined zoning configuration. The first predetermined configuration may include first predetermined masking information, and activating the first predetermined configuration may include activating the first predetermined masking information for use on a data storage system connected to the network. The data storage system may include at least some target ports of the target set.

In at least one embodiment, the second selection criteria may include at least one metric regarding workload of one or more components including any of a target port of the data storage system, an initiator port of a host, a front end adapter of the data storage system, a storage group of one or more storage devices of the data storage system, a path between an initiator port and a target port. The second selection criteria may include criteria identifying when the one or more components are considered overloaded having a current workload exceeding a specified threshold. The one or more components may include a plurality of components, and wherein the second selection criteria may include criteria identifying when the plurality of components are considered to have unbalanced workloads thereby requiring redistribution. Activating the second predetermined configuration may include issuing a second command to the switch to activate the second predetermined zoning configuration. The second predetermined configuration may include second predetermined masking information, and wherein said activating the second predetermined configuration may include activating the second predetermined masking information for use on the data storage system connected to the network.

BRIEF DESCRIPTION OF THE DRAWINGS

Features and advantages of the present invention will become more apparent from the following detailed description of exemplary embodiments thereof taken in conjunction with the accompanying drawings in which:

FIGS. 6, 7, 8, 9A and 9B describe a first example illustrating an embodiment in accordance with the techniques herein;

FIGS. 10, 11, 12A and 12B describe a second example illustrating an embodiment in accordance with the techniques herein.

DETAILED DESCRIPTION OF EMBODIMENT(S)

Figure 1:
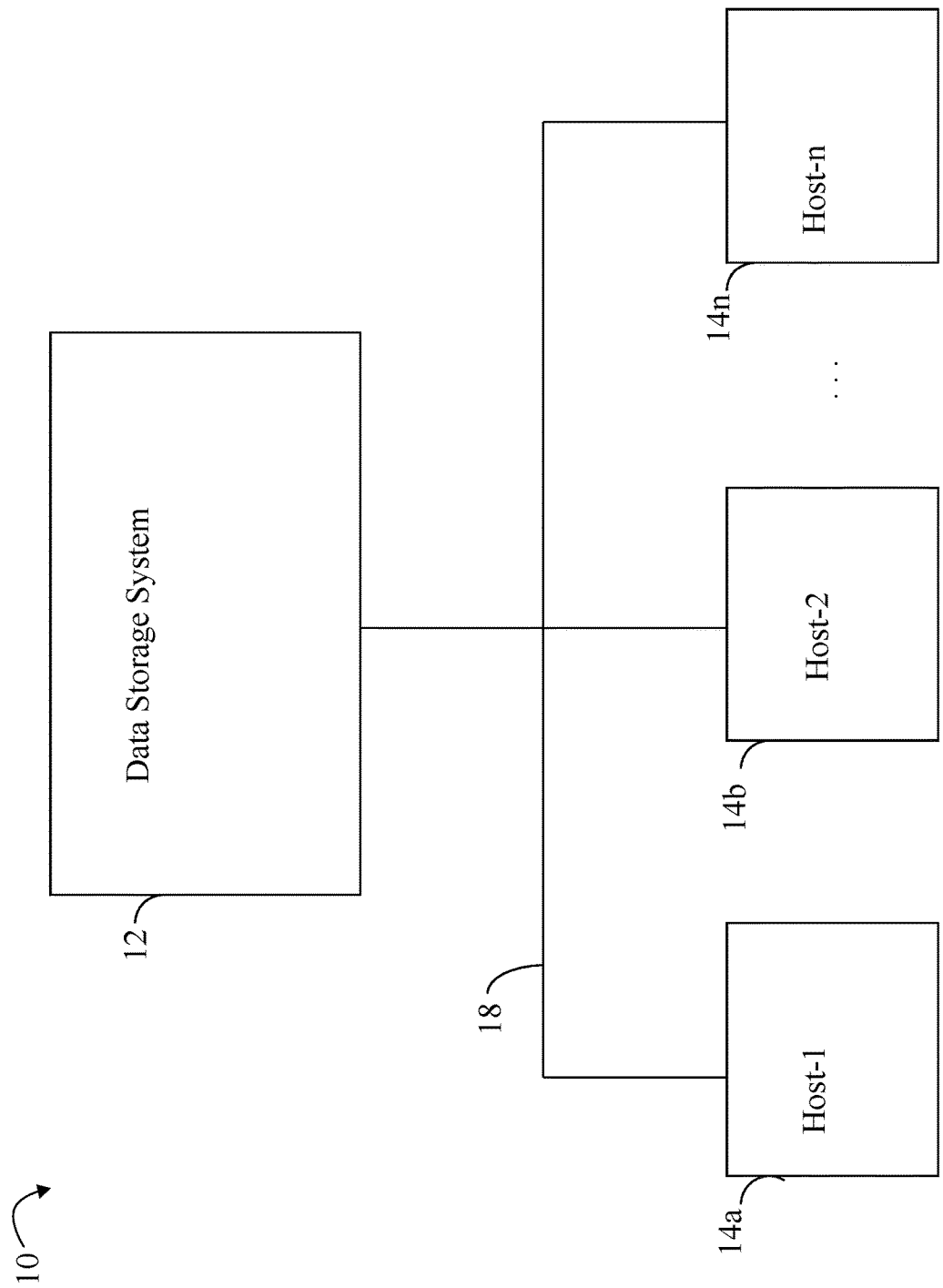
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, NVMe (Non-Volatile Memory Express) over Fabrics, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
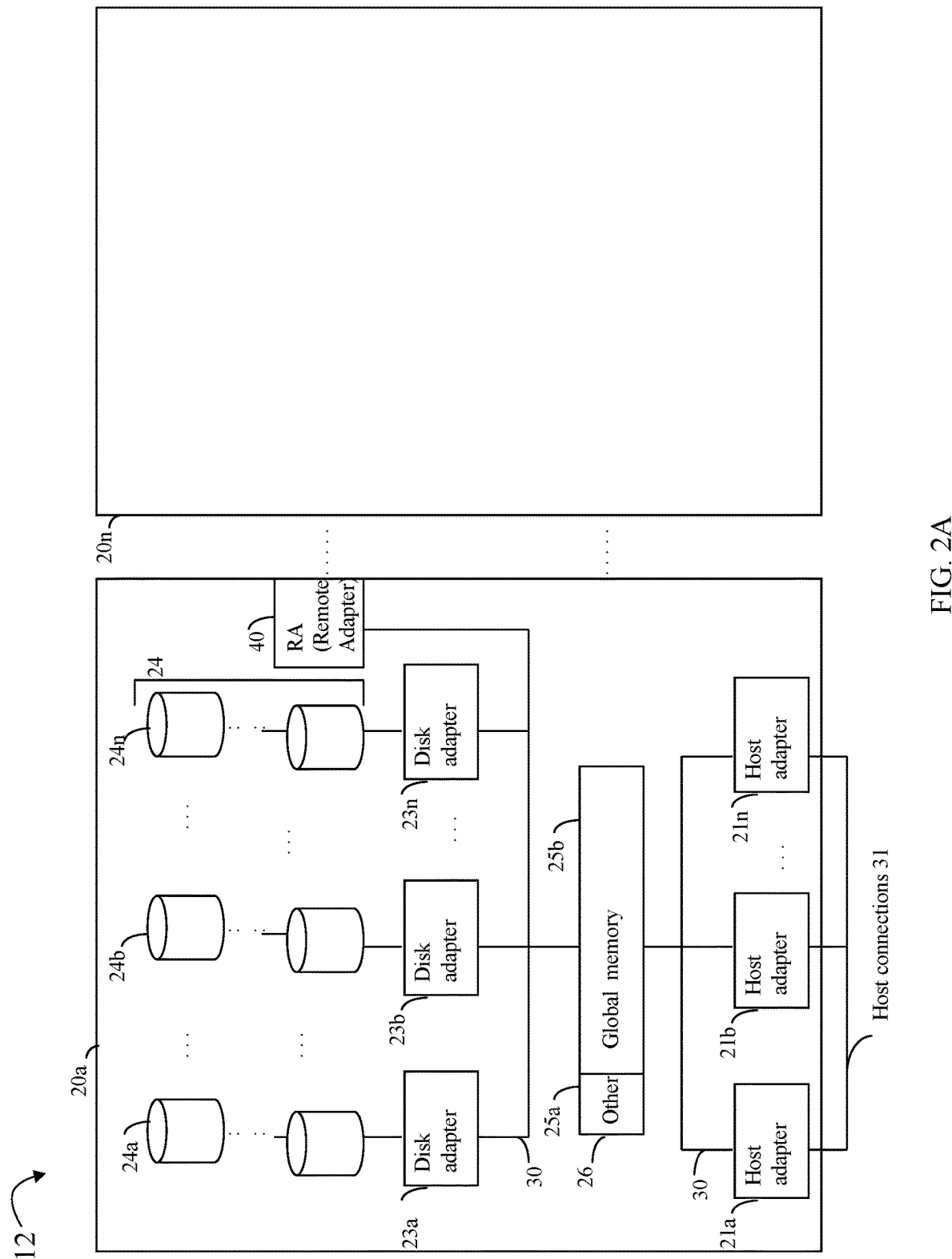
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices (e.g., SLC (single level cell) flash, MLC (multi-level cell) flash, TLC, (tri-level cell) flash) or more generally solid state drives (SSDs), and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host (e.g., receive host I/O commands and send responses to the host) may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA physically accesses the back-end non-volatile storage devices, such as physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as the non-volatile physical storage device (PDs of 24) accessed by a DA. In connection with reads, processing may include first looking to see if the requested read data is in cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

Figure 2B:
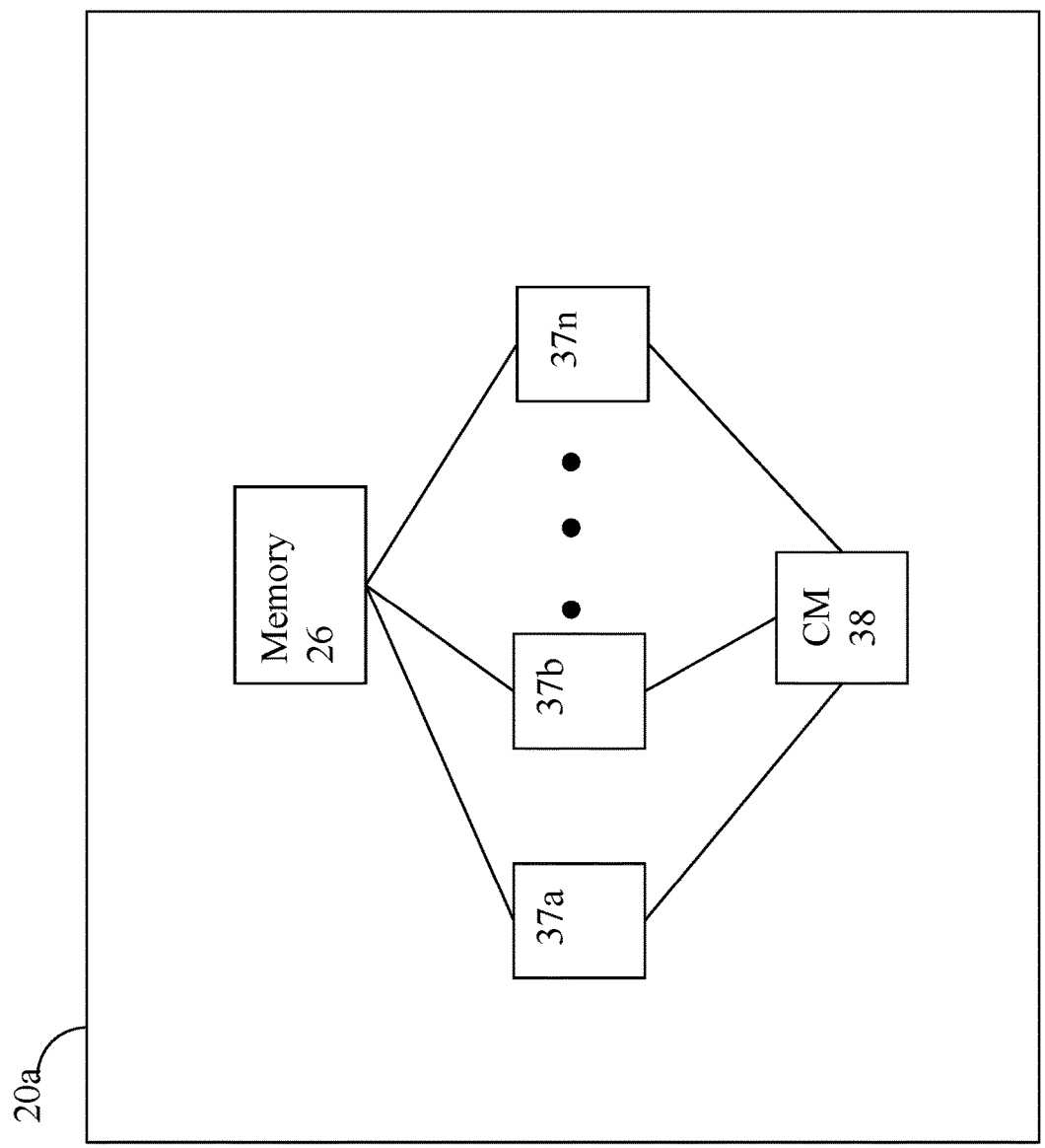
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based or block based I/O commands, and/or file-based I/O commands) that read and/or write user data to a data storage system, and also receiving a response (possibly including requested data) in connection such I/O commands.

The data path or I/O path may be contrasted with a control path. The data or I/O path and control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on a management system, such as another computer system or other device with a processor that is connected to the data storage system 12. Such commands may be, for example, to establish or modify data services; view performance or health of various system components and storage entities; provision storage; perform user account management; and the like. For example, commands may be issued over the control path to provision storage for LUNs; define a storage group (SG) which is a logically defined group of one or more LUNs; create a snapshot; define conditions of when to create another snapshot; define or establish local and/or remote replication services; define or modify a schedule for snapshot or other data replication services; define a RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

Figure 3:
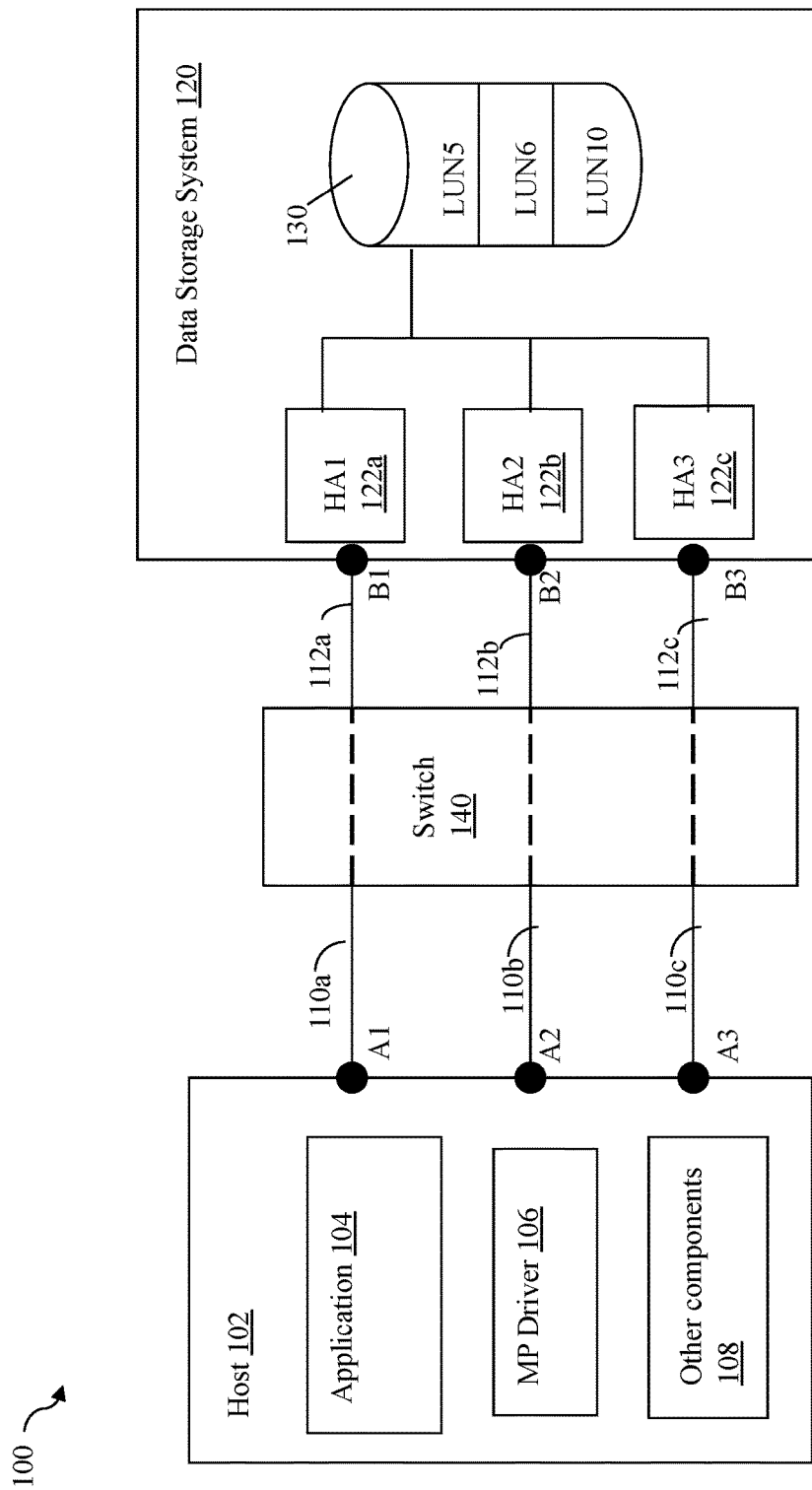
FIG. 3 is an example of systems and components that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The MP driver 106 may be included in a commercially available product such as, for example, Dell® EMC PowerPath® software by Dell Inc. The host 102 may also include other components 108 such as one or more other layers of software used in connection with communicating the I/O operation from the host to the data storage system 120. For example, element 108 may include Fibre Channel (FC), SCSI and/or NVMe drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC, SCSI or NVMe driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
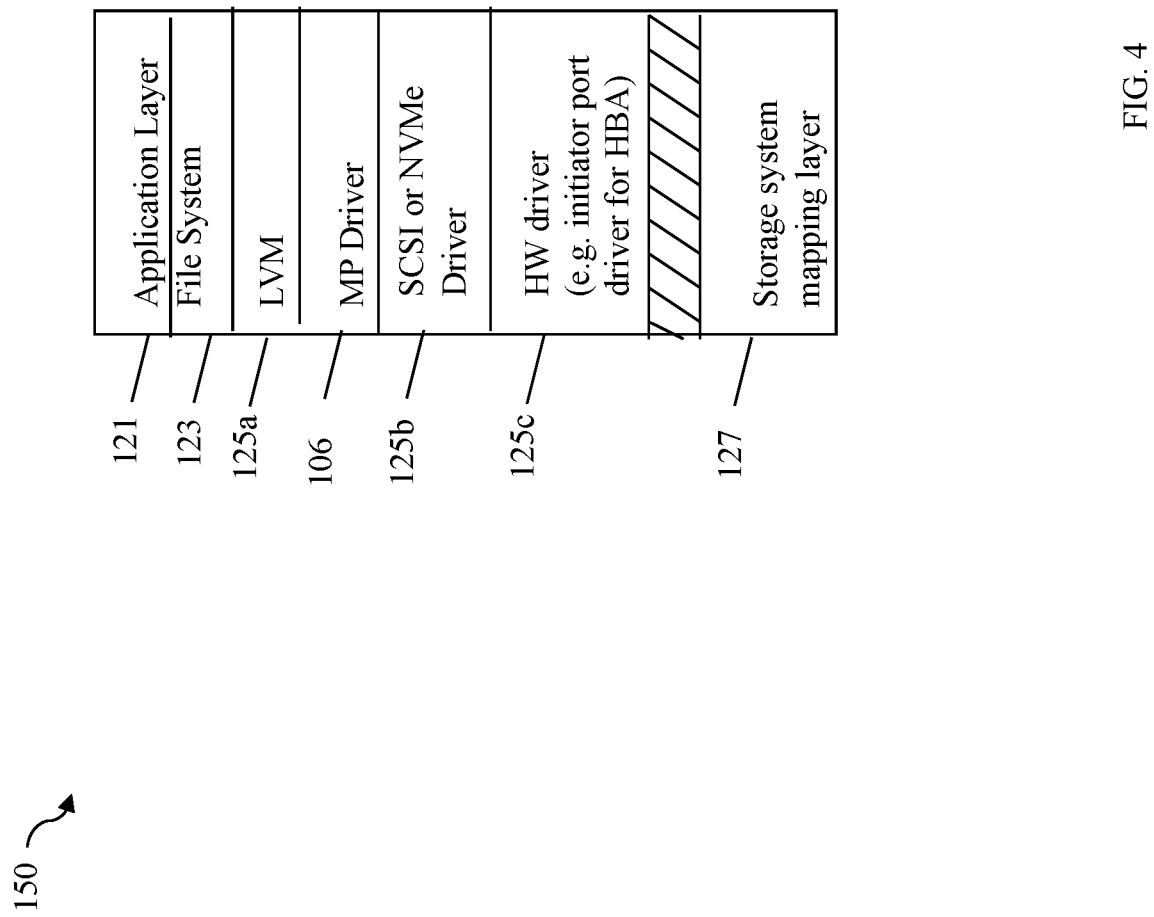
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI or NVMe driver 125b and a hardware (HW) driver 125c. In at least one embodiment the driver 125b may be a SCSI driver that handles processing of a received I/O request from the MP driver 106 such as related to forming a request in accordance with the SCSI standard. As a variation, in at least one embodiment, the driver 125b may be an NVMe driver that handles processing of a received I/O request from the MP driver 106 such as related to forming a request in accordance with the NVMe standard. At least one embodiment in accordance with the techniques herein may operate in accordance with the NVMe protocol as described, for example, in the NVM Express™ Base Specification, Revision 1.4, Jun. 10, 2019, available at nvmexpress.org/wp-content/uploads/NVM-Express-1_4-2019.06.10-Ratified.pdf. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI or NVMe driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

In connection with some protocols such as SCSI and NVMe, each path as related to sending and receiving of I/O commands may include 2 endpoints. As discussed herein, the host, or port thereof, may be an initiator with respect to I/Os issued from the host to a target port of the data storage system. In this case, the host and data storage system ports are examples of such endpoints. In connection with the NVMe protocol, communication of I/O operations or other commands may be bidirectional in that either endpoint may act as an initiator and either endpoint may act as a target. In contrast, with other protocols such as the SCSI protocol, communication may be unidirectional in that one of the endpoints, such as the host HBA port, is the initiator and the other endpoint, such as the data storage system target port, is the target receiving the commands from the initiator.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify a logical block address (LBA) within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

In at least one embodiment in accordance with techniques herein, zoning may be used in combination with masking. Generally, zoning specifies connectivity between the host and data storage system and masking may be used to further control or limit access to particular LUNs.

Masking may be generally characterized as a process performed on the data storage system that indicates which of the LUNs are exposed over which target ports to which initiators. For example target port B1 may be configured to have 100 LUNs attached or mapped to it where the 100 attached LUNs may be potentially exposed to any initiator. The masking information (also referred to herein as mask information, LUN mask information or masking views (MVs)) provides the HAs of the data storage system and their target ports with additional filtering or access control information identifying which of the 100 LUNs are exposed over which of the target ports to which host initiators. For example, with reference to FIG. 3, assume there are 100 LUNs attached or mapped internally in the data storage system to target port B1. In this example, masking information may indicate that only 3 of the 100 LUNs—specifically LUNs 5, 6 and 10—are exposed to each of the initiators A1, A2 and A3 over each of the target ports B1, B2 and B3.

In at least one embodiment in accordance with techniques herein and with reference back to FIG. 3, zoning may be performed with respect to the switch 140, or more generally, network fabric or switching fabric, whereby connectivity between the host 102 and data storage system 120 is specified. In a SAN, zoning includes allocating resources for device load balancing and may be performed for selectively allowing access to data only to certain users. Essentially, zoning allows an administrator to control who (e.g., which initiator(s)) can see what target ports in a SAN. Using zoning in combination with LUN masking as described herein provides control over who (e.g., what initiator(s)) can see what data/devices (e.g., LUNs) over which target ports in a SAN. Zoning is generally known in the art. Zones may be created by grouping world wide names (WWNs) of host interfaces (e.g., host initiator ports) and data storage system interfaces (e.g., target ports) into zones. The set of zones created may be placed into a zone set or zoning configuration which is then activated on the fabric, such as the switching fabric to define the connections between host initiators and target ports of the data storage system. Zoning may be performed by issuing requests or commands to the switch. For example, with reference back to FIG. 3, a host initiator may be host initiator port A3 which is zoned to target ports B1, B2 and B3 of the data storage system. Similarly, host initiator ports A1 and A2 may each be zoned to target ports B1, B2 and B3 of the data storage system. Once such zones are created and activated, the various affected ports may be notified by the switching fabric (e.g., via RSCN or registered state change notification in FC protocol) and can perform processing to discover the zoning changes and log into the switch to establish any new zoned connections.

Thus, zoning may be generally characterized as defining connections providing connectivity between the various host initiators and target ports. Existing connectivity including a set of connections between the host initiators and target ports may be modified by accordingly modifying existing zoning information currently activated or in use by the switching fabric. Such modification may include any of creating a new zone, modifying and/or replacing zoning information of an existing zone, deleting an existing zone, and the like. A zoning modification may be made by issuing appropriate requests to the switching fabric.

In an embodiment in accordance with techniques herein using zoning and masking, zoning of switch 140 may be performed to define the connectivity between the host 102 and data storage system 120 through the switch 140. Masking may then be used by the data storage system to further control which LUNs of the data storage system 120 are exposed, accessible or visible, through which of the target ports B1-B3, to each of the initiators 110a-c of the host 102.

In some existing systems, after zoning of the switch is performed to define the connectivity between the host and data storage system, masking information may be specified and used by the data storage system 120. The masking information specifies which host initiators have access to which LUNs over which target ports of the data storage system 120.

In at least one embodiment in accordance with techniques herein, processing may be performed to define and create masking views specifying masking information. Such techniques may be performed after zoning of the one or more switches (e.g., switching or network fabric) is performed to define connectivity between the host(s) and data storage system(s). In at least one embodiment, a masking view (MV) may be created for each host. Each MV specified for a host may identify what LUNs are accessible to which initiators of the host over which of the target ports of the data storage system. Thus, each instance of an MV associated with a particular host may include a port group (PG), an initiator group (IG), and a device group or storage group (SG). The PG may identify one or more target ports of the data storage system. The IG may identify one or more initiators of the host associated with the MV instance. The SG may identify one or more LUNs. In this manner, the MV associated with a host may denote that the LUNs of the SG are accessible to the initiators (of the host) of the IG over target ports of the PG.

In one embodiment, each initiator and each target port of the data storage system may have an associated WWN and the masking information identifies which initiator WWNs are allowed to access particular LUNs on each target port WWN of the data storage system. In the MV for a host, the IG may identify the WWNs of host initiators and the PG may identify the WWNs of target ports of the data storage system.

In at least one embodiment in accordance with techniques herein, each host may be uniquely identified using an associated HOST NAME. The HOST NAME may be a customer-specified, human-readable name, such as an alphabetic or alphanumeric string providing an easier way for a human to reference or uniquely identify a particular host in a customer system (e.g., such as a customer SAN). In such an embodiment, the MV for a particular host may be associated with, or mapped to, the host's HOST NAME. In this way, the MV of a host may be indexed and accessed using the HOST NAME. Additionally, the HOST NAME may be mapped, indexed, or associated with one or more IP addresses (e.g., network addresses) of the host. An embodiment may therefore provide access to a host's MV through the host's HOST NAME and/or one or more of the host's network addresses that are mapped or associated with the HOST NAME.

Figure 5:
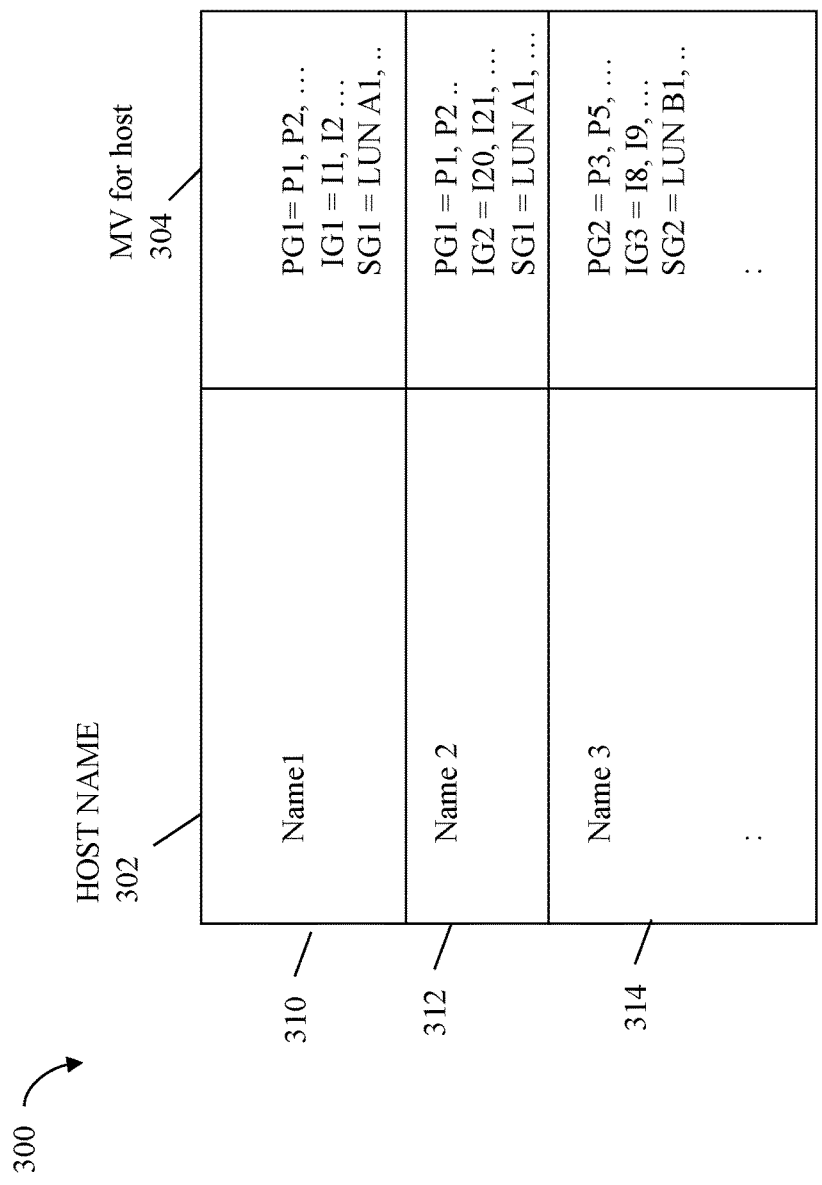
FIG. 5 is an example of information that may be included in a masking view defined for hosts in an embodiment in accordance with techniques herein.

Referring to FIG. 5, shown is an example of masking information that may be created and used in an embodiment in accordance with techniques herein. In the example 300, shown is a table of MVs for a plurality of hosts. Each row of the table denotes an MV instance in column 304 configured for a particular host identified in column 302 of the same row. The table 300 may index or provide access to MVs using the host's unique HOST NAME (column 302) as described elsewhere herein. For example, consider an embodiment in which the table 300 is indexed and accessed by HOST NAME in column 302. (e.g., Each host's HOST NAME denoted in column 302 uniquely identifies a particular host). Generally, the example 300 uses the notation PGn, n being an integer greater than 0, to identify an instance of a PG; uses the notation IGn to identify and instance of an IG; and uses the notation SGn to identify an instance of a SG. In a PG, Pn may denote a target port WWN. In an IG, In may denote an initiator port WWN.

Row 310 may denote a first host having a HOST NAME of Name 1 (as in column 302 of row 310) with an MV as specified in column 304 of row 310. As illustrated in column 304 of row 310, the first host has a first MV including port group PG1, initiator group IG1, and storage group SG1. Row 312 may denote a second host having a HOST NAME of Name 2 (as in column 302 of row 312) with an MV as specified in column 304 of row 312. As illustrated in column 304 of row 312, the second host has a second MV including port group PG1, initiator group IG2, and storage group SG1. Note that SGs and PGs may be defined and reused in different MV instances for different hosts. For example, PG1 may be defined as a set of target ports of the data storage system and SG1 may be defined as a set of particular LUNs where both PG1 and SG1 are used in the MVs of rows 310 and 312. Row 314 may denote a third host having a HOST NAME of Name 3 (as in column 302 of row 314) with an MV as specified in column 304 of row 314. As illustrated in column 304 of row 314, the third host has a third MV including port group PG2, initiator group IG3, and storage group SG2.

In at least one embodiment in accordance with techniques herein, the host may perform processing, such as when the host is booted, to discover and establish connectivity between the host and data storage system. In particular, the host may perform processing to discover and establish connectivity with the switch (e.g., more generally network or switching fabric) and also between the switch and data storage system. For example, an HBA initiator port of a host may log into the switch and provide identifying information of the initiator port, such as the initiator port's WWN. The switch may provide the initiator port with information regarding what data storage system target ports are visible or exposed from the switch. In turn, the host initiator port may then proceed to login to the target ports of the data storage system where the host initiator port provides its WWN along with possibly other configuration information, such as the HOST NAME, sent during the login.

In connection with a SAN such as illustrated in FIG. 3, customers may find it difficult to specify connectivity or a configuration of paths defining which hosts and host ports are connected to which data storage system ports and which LUNs are exposed over which data storage system ports to which host ports. In at least one existing system, such a configuration may include specifying an active zoning configuration or set of one or more zones for the switch along with associated masking information used by the data storage system. Furthermore, the task of specifying the active zoning configuration and associated masking information becomes more complex as the complexity of the SAN increases. For example, FIG. 3 illustrates a relatively simple SAN including a single host and single data storage system with a few host ports and a few data storage system ports for illustration. However, existing SANs may include multiple hosts and multiple data storage systems with many more ports and logical devices than illustrated in FIG. 3. Additionally, host I/O workloads comprising multiple LUN I/Os sent to the different data storage system ports may vary over time.

A customer may activate a configuration that includes a zoning configuration for the switch as well as masking information used by the data storage system. The activated configuration may be suitable for most times and most host I/O workloads, but not for all times and all host I/O workloads. The configuration selected and activated may define paths between the host ports and the data storage system ports in a conservative manner to allow for sufficient data storage system port capacity or bandwidth to accommodate bursts of high I/O workload from the host ports. However, such configurations may not provide the most efficient use and allocation of data storage system resources by possible excessively over estimating the data storage system port capacity or bandwidth that may be needed. Furthermore, in some zoning configurations conservatively provisioned to accommodate high I/O workloads only occasionally occurring, bandwidth of the data storage system ports may be highly underutilized at other various points in time.

The data storage system may use target driven zoning (TDZ) in which the data storage system automatically makes changes or modifications to an existing currently active zoning configuration of the switch when zoning changes are needed to accommodate variations in host I/O workloads on the different paths. However, customers may be reluctant to use TDZ where the data storage system automatically makes zoning changes to the active zoning configuration or set of zones in an uncontrolled and independent manner. For example, a first data storage system's automatic zoning change may include adding or removing a zone from an active zoning configuration. The change may benefit the first data storage system but also adversely impact other data storage systems and hosts. The first data storage system may have made the zoning change while only considering its own workload and not the workload of the other data storage systems and possibly other hosts connected to such other data storage systems.

Described in the following paragraphs are techniques that may be used to provide for changes in the configuration of the SAN when there are changes to host I/O workloads. The techniques may include performing automated zoning changes to the switch, or more generally, switch or SAN fabric while still allowing the customer to control the allowable configuration changes.

In at least one embodiment, multiple sets of predetermined, preconfigured or predefined zoning configurations may be loaded into the switch. At any point in time, a single one of the predetermined zoning configuration may be activated in the SAN fabric defining existing paths and connections between host and data storage system ports. As may be needed responsive to changing I/O workloads on the defined paths of the active zoning configuration, another one of the multiple predetermined zoning configurations loaded into the switch may be automatically selected and activated as the current zoning configuration for the switch. In such an embodiment, each of the predetermined zoning configurations may be created and approved by a customer, SAN administrator, and the like. In this manner, the customer may control the possible allowable zoning configurations available for activation by specifying the predetermined zoning configurations as the set of allowable zoning configurations for the switch beforehand. In such an embodiment, the data storage system may be allowed to automatically select one of the predetermined zoning configurations to activate at various points in time responsive to dynamically changing I/O workloads of the host.

In at least one embodiment, the paths or connections between the host and the data storage system may be controlled using one or more control mechanisms. The one or more control mechanisms may include selecting one of the predetermined zoning configurations of the switch as noted above and elsewhere herein. The predetermined zoning configurations may be loaded into the switch and, at any point in time, one of the predetermined zoning configurations may be selected as the active zoning configuration in effect for the switch. The one or more control mechanisms may include selecting one of multiple predetermined or predefined sets of masking information. The predetermined sets of masking information may be specified beforehand in a manner similar to the predetermined zoning configurations. In at least one embodiment, the control mechanisms may include both the predetermined zoning configurations in combination with the predetermined masking information. In at least one embodiment, the one or more control mechanisms may include the predetermined zoning configurations without the masking information.

In at least one embodiment, the one or more control mechanisms may be selected responsive to selection criteria that characterizes various I/O workload and/or performance characteristics, such as of the host, host ports, target ports, and/or LUNs. For example, different selection criteria may be specified for each predetermined zoning configuration where the selection criteria indicates the I/O workload conditions under which the associated predetermined zoning configuration should be selected and activated. For example, different selection criteria may be specified for each predetermined set of masking information where the selection criteria indicates the I/O workload conditions under which the associated predetermined set of masking information may be selected and activated.

In at least one embodiment, the one or more control mechanisms may be used for I/O load balancing or redistribution of the I/O workload among the different ports of the data storage system. In at least one embodiment, the one or more control mechanisms may be used for I/O redistribution of the I/O workload among the different ports of the data storage system responsive to detection of overloaded conditions detected, such as a current I/O workload of one or more of the data storage system ports exceeding a specified maximum I/O workload or threshold workload level. In at least one embodiment, the data storage system may receive I/O workload and/or performance information, such as the I/O workload on each path between a host port and a data storage system target port. Based on the current I/O workload and/or performance information the data storage system may select the particular configuration such as the particular set of predetermined zoning information and/or masking information to use. The data storage system may send a command to the switch instructing the switch to activate the particular set of zoning information selected. In such an embodiment, the data storage system may automatically select one of the predetermined zoning configurations responsive to a change in I/O workload and/or performance in the SAN. In such an embodiment when the data storage system selects the zoning configuration, the data storage system is allowed to select from the set of predetermined configurations rather than make any desired modification to an active zoning configuration. In such an embodiment, the data storage system selects from the multiple predetermined zoning configurations already specified, such as created and approved by a user or customer. In at least one embodiment, the customer may define several zoning configurations and associated selection criteria, and load the predetermined zoning configurations into switch. The data storage system may then select one of the predetermined zoning configurations currently loaded in the switch to activate at different points in time responsive to changes in the I/O workloads and/or performance of the SAN. In this way, the data storage system may automatically select and activate a zoning configuration change in a controlled manner from among predetermined zoning configurations and associated selection criteria. In at least one embodiment, a set of masking information may also be selected for use as part of the active configuration along with the selected zoning configuration.

In at least one embodiment in which the SAN includes multiple data storage systems connected to one or more switches of the SAN fabric, one of the data storage systems may be selected as the central decision maker or master system. The master system may receive I/O workload and/or performance information regarding all the data storage systems in the SAN. The master system may then select and activate a configuration including a predetermined zoning configuration for each of the one or more switches while taking into account the collective I/O workload and/or performance of all hosts and all data storage systems in the SAN.

The foregoing and other aspects of the techniques herein are described in more detail in the following paragraphs.

For simplification of illustration, examples in the following paragraphs may be made with respect to a single switch, single host and single data storage system. However, more generally, the same techniques may be applied for use with more complex networks and SANs including any suitable number of switches, hosts and data storage systems.

As a first step S1, processing may be performed to determine multiple sets of zones or multiple zoning configurations. Each zoning configuration may specify a different configuration of the switch including paths and connectivity in the switch. For example, each zoning configuration may specify the configured paths between host initiator ports and data storage system target ports through the switch. The multiple zoning configurations may be preconfigured or predetermined prior to further use with the techniques herein. The multiple zoning configurations may be created and approved by the customer, SAN administrator or other user. Each of the multiple zoning configurations may specify a complete configuration for the switch and may be loaded into the switch prior to performing subsequent processing in accordance with the techniques herein. At any point in time, one of the predetermined zoning configurations loaded into the switch may be activated as the active zoning configuration implemented for the switch. Responsive to changes in I/O workloads and/or performance, processing may be performed to automatically select another of the predetermined zoning configurations as the active zoning configuration for the switch. Each of the predetermined zoning configurations loaded into the switch may be a different configuration suitable for use with a specified set of I/O workload conditions within the SAN. The specified set of I/O workload conditions associated with a predetermined zoning configuration may be more generally referred to as selection criteria used to identify when to transition the switch into the predetermined zoning configuration (e.g., when to make the predetermined zoning configuration the active or activated zoning configuration for the switch).

Generally, the multiple predetermined zoning configurations of the step S1 may be determined using any suitable technique. In at least one embodiment, the multiple predetermined zoning configurations may be determined using a tool, such as a workload and performance tool implemented using software. The tool may collect I/O workload and/or performance information regarding various aspects of the SAN at different points in time for different active zoning configurations. For example, for various active zoning configurations for the switch, the tool may monitor and collect information including one of more of the following: I/O workloads and/or performance information for each host initiator port, each data storage system target port, per path between each initiator-target port pair, for each LUN on a particular path, for each SG on a particular path, and the like. The tool may provide recommendations regarding, for example, how many data storage system target ports should be connected to each host and at what particular times and under what particular workload and/or performance conditions. The tool may provide recommendations, for example, regarding which one or more host initiator ports should be connected to which one or more data storage system target ports, which SGs or LUNs should be exposed over which data storage target ports to which host initiator ports, and the like. It should be noted that the tool may perform its analysis by actual observations and monitoring of the SAN when in the various active zoning configurations. As a variation, the tool may perform its analysis based on I/O workload and/or performance information obtained in other ways, such as by simulating various active SAN configurations where the I/O workload and/or performance information may be obtained via simulation (e.g., simulating the active zoning configurations for the switch and observing the simulated resulting I/O workloads and/or performance aspects of the initiator ports, target ports, and the like).

The SAN configuration may include one or more switches, one or more hosts and one or more data storage systems.

Generally, the tool may be located and execute on any suitable component or system. For example, in at least one embodiment, the tool may be located and execute on a separate server computer system connected to the SAN. In at least one other embodiment, the tool may be located and execute on the data storage system.

A customer may then use the recommendations and other outputs of the tool to define the predetermined multiple zoning configurations acceptable to, or allowable by, the customer. Each of the predetermined zoning configurations may be associated with a set of selection criteria identifying when to select or activate the associated predetermined zoning configuration. Examples of the selection criteria are described herein. The selection criteria may, for example, identify the particular I/O workload and/or performance conditions within the SAN of when the associated predetermined zoning configuration should be activated or applied to the switch. The selection criteria may also identify other conditions, such as temporal conditions, of when the associated predetermined zoning configuration should be activated or applied to the switch. For example, a temporal or time-based conditions may identify a particular day of the week, time of day, day(s) of the month or year, date (e.g., calendar-based date), and the like.

As a result, multiple predetermined zoning configurations are defined that are allowable and acceptable as active zoning configurations from the customer's perspective.

Additionally, selection criteria may be specified and associated with each predetermined zoning configuration. The selection criteria may be used to identify when to transition between activating different ones of the predetermined zoning configurations, such as for different I/O workload and/or performance conditions. As described in more detail elsewhere herein, processing may be performed to automatically select and activate a particular one of the predetermined zoning configurations when the selection criteria associated with the particular zoning configuration is met, such as when the current I/O workload and/or performance of the SAN matches the selection criteria.

As also part of the step S1, at least one embodiment may also determine multiple sets of predetermined masking information to also be implemented or activated when different ones of the predetermined zoning configurations are activated. In at least one embodiment, each predetermined zoning configuration may have an associated set of predetermined masking information that is activated on the data storage system when the associated predetermined zoning configuration is activated in the switch. In at least one embodiment, the set of predetermined masking information may reflect or comply with the associated predetermined zoning configuration. Furthermore in a manner similar to the predetermined zoning configurations, each of the multiple predetermined sets of masking information may correspond to a different set of selection criteria. A particular one of the predetermined sets of masking information may be selected and activated responsive to detecting the occurrence of current load and/or performance conditions matching the selection criteria associated with the particular one of the predetermined sets of masking information. In at least one embodiment using a combination of masking information and zoning configurations, the same selection criteria may be associated with a predetermined zoning configuration and an associated one of the predetermined sets of masking information. In such an embodiment, responsive to determining current I/O workload and/or performance conditions meet the selection criteria, the corresponding predetermined zoning configuration and the associated predetermined masking information.

Consistent with discussion herein, an embodiment in accordance with the techniques herein may implement using zoning configurations alone or in combination with masking. In such embodiments, the zoning configurations and masking information may be predefined or predetermined based on configurations and masking information created and approved, for example, by the customer, SAN administrator, and the like.

At least one embodiment in accordance with the techniques herein may use zoning configurations without masking thereby omitting using of predetermined sets of masking information as described herein.

An embodiment may use predetermined zoning configurations in combination with predetermined masking information. In at least one embodiment, the masking information may match or comply with the active zoning configuration. In at least one embodiment, the masking information may be used to further refine control or limit, for example, which LUNs are exposed over which target ports to which initiator port. Rebalancing may be performed by activating a different one of the predetermined zoning configurations and/or different set of predetermined masking information.

An embodiment may have a predetermined zoning configuration that is active and may rebalance or redistribute the I/O workload using only masking information. In such an embodiment, there may be multiple predetermined sets of masking information where each set is associated with one or more selection criteria. In such an embodiment, for example, in the predetermined zoning configuration, each initiator port may be zoned to all target ports (e.g., each initiator port may send I/Os to all target ports and, based on the zoning configuration alone, all LUNs may be exposed over all target ports zoned to all initiator ports). The masking information may be used to further restrict the particular LUNs exposed over which target ports to which initiator ports. Furthermore, each of the multiple predetermined sets of masking information may correspond to a different set of selection criteria. A particular one of the predetermined sets of masking information may be selected and activated responsive to detecting the occurrence of current load and/or performance conditions matching the selection criteria associated with the particular one of the predetermined sets of masking information. In such an embodiment, one of the predetermined sets of masking information may be active at a point in time. Subsequently, responsive to detecting a change in workload and/or performance conditions associated with a second of the sets of masking information, the second set of masking information may be activated to rebalance or redistribute the workload. In such an embodiment, the rebalancing or redistribution of the workload may be performed without activating a different predetermined zoning configuration.

Subsequent to the first step S1, a second step S2 may be performed in which the multiple predetermined zoning configurations are loaded into the switch. In at least one embodiment, the multiple predetermined zoning configuration may be loaded into the switch and at any point in time, one of the predetermined zoning configurations loaded in the switch may be activated or applied to the switch. The switch may also have the ability to swap between different loaded zoning configurations thereby activating different ones of the loaded zoning configurations at different points in time. Also in the step S2, processing may be performed to initially select and activate one of the multiple predetermined zoning configurations loaded into the switch. Additionally, in at least one embodiment also using masking information, a set of predetermined masking information (that is associated with the initially activated predetermined zoning configuration) may be applied or activated on the data storage system. In this manner, the currently active or activated configuration may include the currently activated zoning configuration and also the currently activated set of masking information.

A zoning configuration loaded in the switch may be activated in any suitable manner. For example, in at least one embodiment, a command may be sent to the switch to activate a different loaded zoning configuration. The command may be, for example, input using a management application, such as via a management GUI where the command may be input over the control or management path. The command may be, for example, sent as a command from the data storage system over the control or management path. The command may be sent as part of processing in accordance with the techniques herein as described in the step S2 and other steps to automatically activate zoning configuration changes of the switch responsive to dynamic changes in I/O workload and/or performance in the SAN.

In a third step S3, the SAN I/O workloads and/or performance may be continually monitored, such as using the tool described herein. In this manner as part of the step S3, the current I/O workload and/or performance conditions of the SAN may be observed and monitored to detect I/O workload and/or performance changes triggering a modification to the currently activated zoning configuration of the switch. For example, in at least one embodiment, the I/O workload and/or performance conditions of the SAN may be monitored to detect when changes in the I/O workload and performance match or meet the selection criteria of a predetermined zoning configuration, whereby the selection criteria indicate when to transition from a current active zoning configuration to a different one of the predetermined zoning configurations. The data storage system may, for example, determine when there has been such a change in the I/O workload and/or performance conditions of the SAN that match a different one of the predetermined zoning configurations other than the currently activated zoning configuration.

In a fourth step S4, responsive to detecting the change and determining the current I/O workload and/or performance conditions of the SAN match or meet the selection criteria of a different predetermined zoning configuration, processing may be performed to automatically activate the different predetermined zoning configuration. In at least one embodiment, the step S4 may be performed by sending a command from the data storage system to the switch to activate the different predetermined zoning configuration. In at least one embodiment, the step S4 may also include the data storage system applying or activating predetermined masking information changes that comply with, or are in accordance with, the currently activated zoning configuration.

In at least one embodiment, the processing of the steps S3 and S4 may be performed in an ongoing and continual manner to automatically and dynamically activate different ones of the predetermined zoning configurations at different points in time as the I/O workload and/or performance of the SAN changes over time. In at least one embodiment, such continual monitoring may include monitoring the host initiator ports and data storage system target ports for one or more I/O workload and/or performance indicators, some of which are described herein.

In at least one embodiment, the SAN may include multiple switches, multiple data storage systems and multiple hosts. In such an embodiment, one of the data storage systems may be selected as the master system which collects I/O workload and/or performance information for all the multiple hosts and data storage systems in the SAN. The master system may then make decisions in accordance with the techniques herein collectively for all switches, data storage systems and hosts. The master system may automatically select and activate predetermined zoning configurations for all the switches based on the current I/O workload and/or performance information of the multiple hosts and data storage systems in the SAN.

Generally, any suitable component(s) may perform the analysis regarding the current I/O workload and/or performance of the SAN and detect changes thereto that trigger changing the activated zoning configuration of the switch. In a similar manner, any suitable component(s) may communicate with the switch to issue commands to the switch to automatically activate different ones of the predetermined zoning configurations responsive to changes in the I/O workload and/or performance conditions of the SAN at various points in time.

Consistent with discussion herein, processing may be performed to monitoring the I/O workload load and other indicators of the data storage system front end components (e.g., front end adapters and target ports thereof) to assist in determining whether any changes to existing connectivity between the data storage systems and hosts are needed. In at least one embodiment, the results of such monitoring may be provided using a tool to the data storage system that automatically decides what, if any, desired changes should be made to existing connectivity where any such changes may also be implemented automatically such as by performing processing that automatically selects one of the predetermined zoning configurations of the switching fabric to activate.

Described in following paragraphs are techniques that may be used in an embodiment to provide automatic load balancing as may be performed by the data storage system that decides what, if any, changes are needed to existing connectivity between data storage systems and hosts. Such techniques provide for automatically redistributing load across or among target ports and front end adapters (e.g., data storage system front end components) as may be needed responsive to automatic monitoring of the current I/O workload and/or performance of data storage system components, host components, and/or devices (e.g., LUNs). Such techniques provide for dynamic relocation or redistribution of I/O workload among or across different data storage system front end components such as by dynamically activating different ones of the predetermined zoning configurations at various points in time responsive to changing I/O workload and/or performance conditions in the SAN. The techniques herein provide for automatically selecting different predetermined zoning configurations of the switching fabric based on selection criteria, as described in more detail below. In one aspect, each HA or front end component, and target port thereof, may be characterized as having a maximum workload capacity (e.g., such as expressed in terms of IOPS (I/Os per second), MBps (megabytes per second), and the like) which may be distributed or balanced in connection with techniques described herein in more detail.

It should be noted that in following paragraphs, the techniques herein may be described in embodiment using FC or FCoE (Fibre channel over Ethernet) fabrics. However, as will be appreciated by those skilled in the art, a similar approach may be used in connection with other network fabrics such as in an embodiment using SCSI in an Ethernet LAN.

What will now be described are examples further illustrating use of the techniques herein. It should be noted that in connection with the examples in following paragraphs, such as in FIGS. 6, 7, 8, 10, 11, illustrated are zoned configurations or zoned connectivity. In such an embodiment, there may be additional actual physical links or physical connections between ports of the host and the switch and between ports of the data storage system and the switch. For example, the FIG. 3 may denote the physical ports of the host and data storage system and the physical links or connections to the switch. However, the particular zoned paths or connections may vary with the particular activated zoning configuration such as, for example, illustrated in FIGS. 6, 7, 8, 10 and 11.

Figure 6:
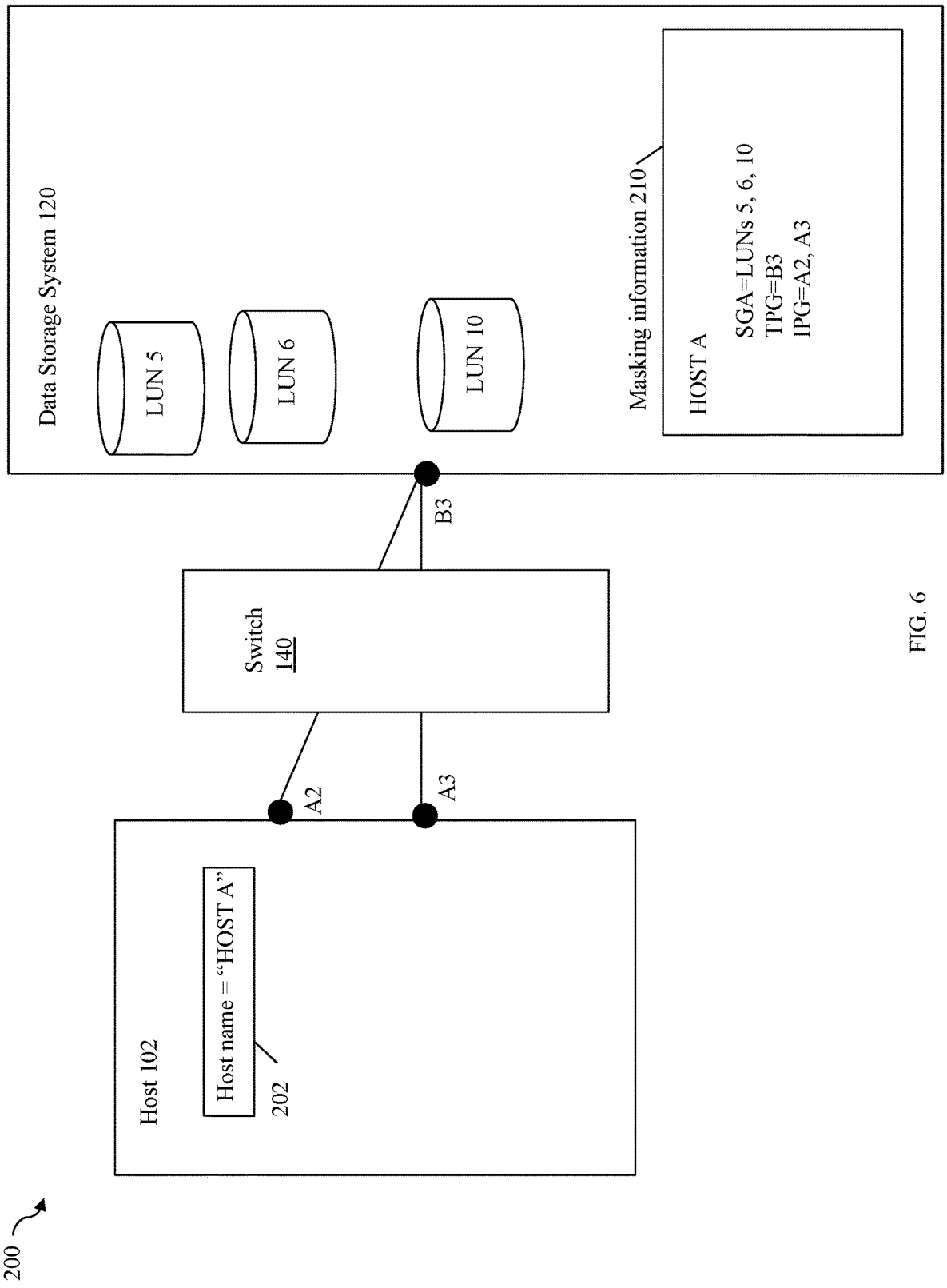

Referring to FIG. 6, shown is an example of components that may be used in an embodiment in accordance with the techniques herein. The example 200 includes the host 102 and data storage system 120 as described in connection with the FIG. 3. In this example, the 3 LUNs 5, 6 and 10 may be included in the same SG, SG A. In the example 200, assume for illustration purposes that initiator port A3 is only zoned to target port B3 whereby LUNs 5, 6 and 10 are exposed to A3 only over target port B3 (and not exposed through target ports B1 and B2). Also assume that initiator port A2 is similarly zoned only to target port B3 whereby LUNs 5, 6 and 10 are exposed to A2 only over target port B3 (and not exposed through target ports B1 and B2). Assume further that A1 is not included in any zone and therefore has no connectivity to the data storage system 120 and currently target ports B1 and B2 are not zoned. Thus, all I/Os and other commands directed to LUNs 5, 6 and 10 from A2 and A3 flow only through target port B3. The paths or connections A2-B3 an A3-B3 in the FIG. 6 denote the connections through the switch 140 in the currently active zoning configuration of the switch 140.

In connection with the example 200, multiple predetermined zoning configurations may be constructed and loaded into the switch 140 where a first predetermined zoning configuration may be activated having the paths or connections A2-B3 and A3-B3. The multiple predetermined zoning configurations may include other predetermined zoning configurations described in more detail in following paragraphs and figures.

The element 210 of the FIG. 6 illustrates a predetermined set of masking information that may also be the currently activated set of masking information in use by the data storage system. In this example, the masking information 210 may be one of multiple predetermined sets of masking information. A different one of the multiple predetermined sets of masking information may be associated with each of the multiple predetermined zoning configurations and also associated with a set of selection criteria identifying when to transition into, or activate, the associated predetermined zoning configuration and associated masking information.

The masking information 210 indicates that SG A includes LUNs 5, 6 and 10; that the TPG=B3 and the IPG=A2 and A3. Thus the masking information 210 matches or complies with the first predetermined zoning configuration activated in the example 200.

Processing may be performed to monitor the workload of B3 of the example 200. Such workload may be expressed in terms of any suitable metric, measurement or statistic. For example, such workload may be expressed in terms of observed I/O throughput (e.g., I/Os per second or TOPS) and/or data throughput (e.g., Mbytes per second or MBps). Each target port may have a specified maximum workload capacity denoting the maximum amount of load the target port is capable of handling. Such maximum workload capacity may denote 100% utilization of the target port. A workload threshold may be specified denoting an upper bound for the observed workload for the target port where it may be desirable, on average over time, to keep the observed workload of a target port below the specified workload threshold. The workload threshold may be an acceptable or desirable upper limit that is less than the specified maximum workload capacity. For example, the workload threshold may be some percentage (e.g. 70%) of the maximum workload capacity.

If the observed workload of the target port reaches or exceeds the workload threshold, the target port may be characterized as overloaded. It should be noted that in a similar manner, values for maximum workload capacity (=100% utilization), observed workload, and workload threshold may be specified for other target ports as well as for each front end adapter (e.g., each HA 122*a-c* of FIG. 3).

Continuing with the example, in response to detecting the observed workload of the target port B3 exceeding the workload threshold, processing may be performed to select and activate a second of the predetermined zoning configurations having associated selection criteria matching the current overloaded conditions of the target port B3. In this example, the second predetermined zoning configuration loaded into the switch may define a second alternate configuration of the switch 140 which redistributes the I/O workload of the target port B3. The selection criteria associated with the second predetermined zoning configuration may specify to activate the second predetermined zoning configuration responsive to the current I/O workload of B3 being overloaded, such as having a utilization that is greater than or equal to 70%. This redistribution of B3 workload may be accomplished, for example, by having the second predetermined zoning configuration shift a portion of the workload currently flowing through B3 to another target port of the data storage system having available bandwidth. For example, since both the workload of A2 and A3 flow through only target port B3 in the first zoning configuration of the FIG. 7, the second predetermined zoning configuration may specify a zoning configuration of the switch 140 that redistributes the workload of one of the initiators A2 or A3 to another target port, such as B1 or B2 having available bandwidth (e.g., which may have a current observed workload that is well below its associated workload threshold).

Figure 7:
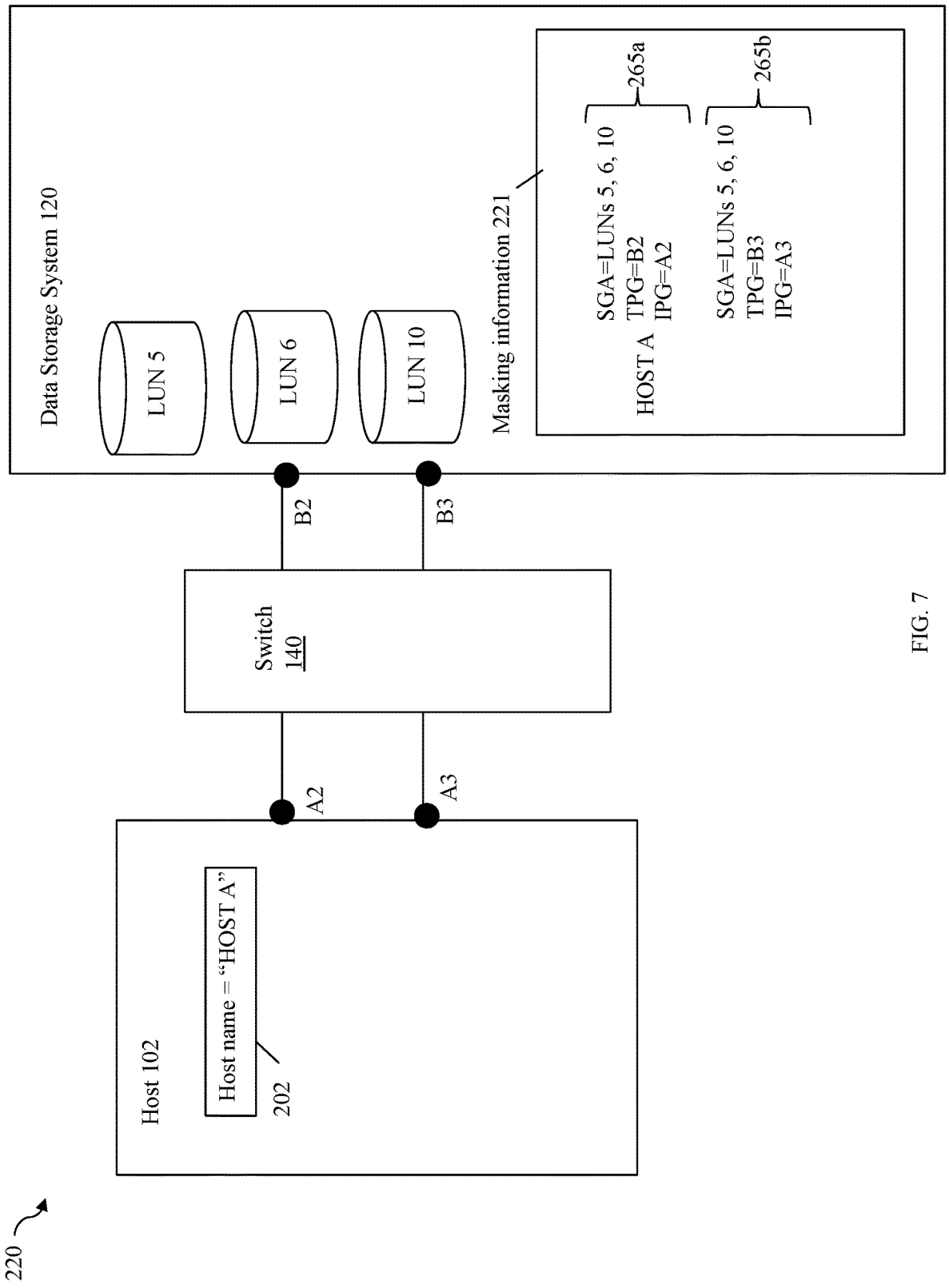

Referring to FIG. 7, shown is an example illustrating the activation of the second predetermined zoning configuration in an embodiment in accordance with the techniques herein. The second predetermined zoning configuration specifies two active paths A2-B2 and A3-B3. The second predetermined zoning configuration may be one of the multiple predetermined zoning configuration loaded into the switch. Responsive to detecting the overload conditions on B3, the data storage system may perform processing to select the second predetermined zoning configuration and activate the second predetermined zoning configuration in the switch 140. For example, the data storage system may issue a command to the switch 140 to activate the second predetermined zoning configuration as depicted in FIG. 7.

Additionally, a second predetermined set of masking information may be activated as illustrated by 221. The second set of masking information may be complementary with respect to the second predetermined zoning configuration. The element 265*a* of the masking information 221 indicates that I/Os issued from initiator port A2, where such I/Os are directed to LUNs 5, 6 and 10 of the SG A, may be sent to the target port B2. The element 265*b* of the masking information 221 indicates that I/Os issued from initiator port A3, where such I/Os are directed to LUNs 5, 6 and 10 of the SG A, may be sent to the target port B3.

The foregoing second predetermined zoning configuration as illustrated in FIG. 7 defines a switch configuration that includes, as compared to FIG. 6, a new zoned connection between A2 and B2 and removes the prior zoned connection between A2 and B3 (as in FIG. 6). Processing may include modifying the masking information on the data storage system to now use the second predetermined set of masking information 221 rather than the first predetermined set of masking information 210 to indicate that LUNs 5, 6 and 10 are now exposed to A2 over only target port B2.

In an embodiment in accordance with techniques herein, processing may be performed to assess whether workload of the target port B3 is overloaded and thus requires a redistribution of the workload. Processing may further determine that the workload redistribution may be accomplished by activating the second predetermined zoning configuration and associated second set of masking information 221 as described above. The data storage system management software or other means may be used to also accordingly automatically update the masking information.

In response to activating the second predetermined zoning configuration in the switch 140, the switch may notify the host of the change in zoning configuration. For example, each affected initiator of the host may be notified regarding the zoning configuration change, such as via RSCN messages mentioned herein and known in the art. In response to receiving the notification, the host initiator may perform discovery processing such as by issuing commands to the switch to obtain the zoning configuration of the activated second predetermined zoning configuration. The discovery processing may include, for example, the discovery of the additional path A2-B2 and the removal of the path A2-B3.

Continuing with the example, assume now that processing continues to further monitor the workload of the target ports B2 and B3 and that processing determines that both B2 and B3 are overloaded. For example, processing may determine that the current I/O workload of B2 exceeds the specified utilization threshold of 70% and also that the current I/O workload of B3 exceeds the specified utilization threshold of 70%.

Continuing with the example, in response to detecting the observed workload of the both target ports B2 and B3 both exceeding the workload threshold, processing may be performed to select and activate a third of the predetermined zoning configurations having associated selection criteria matching the current overloaded conditions of the target ports B2 and B3. In this example, the third predetermined zoning configuration loaded into the switch may define a third alternate configuration of the switch 140 which further redistributes the I/O workload of the host directed to SG A along an additional third path A1-B1. The selection criteria associated with the third predetermined zoning configuration may specify to activate the third predetermined zoning configuration responsive to the current I/O workload of both B2 and B3 being overloaded, such as having when both B2 and B3 each have a utilization that is greater than or equal to 70%. This further redistribution of SG A I/O workload may be accomplished, for example, by having the third predetermined zoning configuration shift a portion of the workload currently flowing through the 2 existing paths as illustrated in FIG. 7 through another additional path A1-B1 having available bandwidth.

Figure 8:
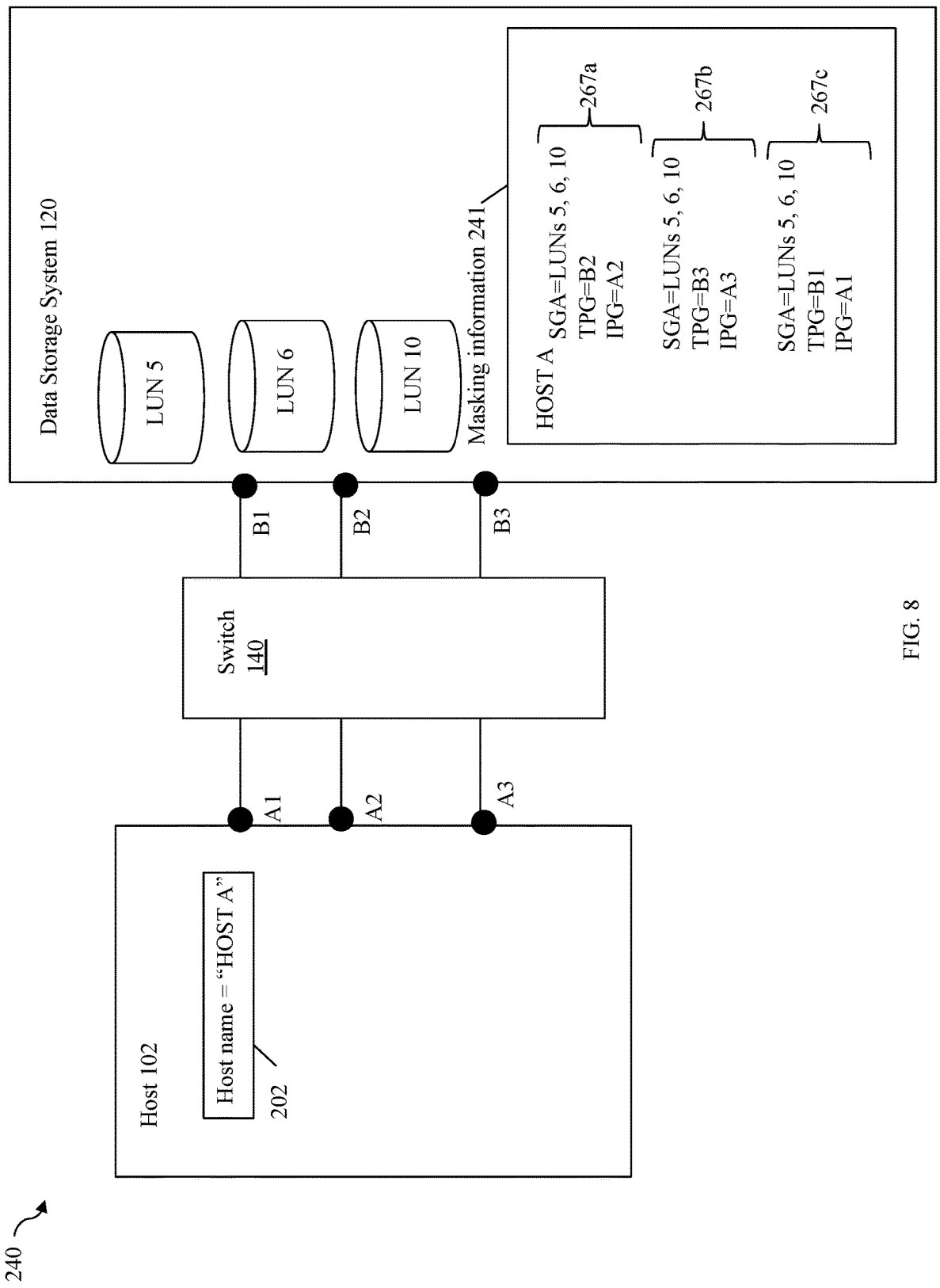

Referring to FIG. 8, shown is an example illustrating the activation of the third predetermined zoning configuration in an embodiment in accordance with the techniques herein. The third predetermined zoning configuration specifies three active paths A1-B1, A2-B2 and A3-B3. The third predetermined zoning configuration may be one of the multiple predetermined zoning configuration loaded into the switch. Responsive to detecting the overload conditions on B2 and B3, the data storage system may perform processing to select the third predetermined zoning configuration and activate the third predetermined zoning configuration in the switch 140. For example, the data storage system may issue a command to the switch 140 to activate the third predetermined zoning configuration as depicted in FIG. 8.

Additionally, a third predetermined set of masking information may be activated as illustrated by 241. The third set of masking information may be complementary with respect to the third predetermined zoning configuration. The element 267a of the masking information 241 indicates that I/Os issued from initiator port A2, where such I/Os are directed to LUNs 5, 6 and 10 of the SG A, may be sent to the target port B2. The element 267b of the masking information 241 indicates that I/Os issued from initiator port A3, where such I/Os are directed to LUNs 5, 6 and 10 of the SG A, may be sent to the target port B3. The element 267c of the masking information 241 indicates that I/Os issued from initiator port A1, where such I/Os are directed to LUNs 5, 6 and 10 of the SGA, may be sent to the target port B1.

The foregoing third predetermined zoning configuration defines a switch configuration that includes, as compared to FIG. 7, a new zoned path or connection between A1 and B1. Processing may include modifying the masking information on the data storage system to now use the third predetermined set of masking information 241 rather than the second predetermined set of masking information 221.

In an embodiment in accordance with techniques herein, processing may be performed to assess whether workload of the target ports B2 and B3 are overloaded and thus requires a further redistribution of the workload directed to SG A. Processing may further determine that the workload redistribution may be accomplished by activating the third predetermined zoning configuration and associated third set of masking information 241 as described above. The data storage system management software or other means may be used to also accordingly automatically update the masking information.

As discussed elsewhere herein, in response to activating the third predetermined zoning configuration in the switch 140, the switch may notify the host of the change in active zoning configuration, and the host may perform discovery processing such as by issuing commands to the switch to obtain the zoning configuration of the activated third predetermined zoning configuration. The discovery processing may include, for example, the discovery of the additional path A1-B1.

Figure 9A:
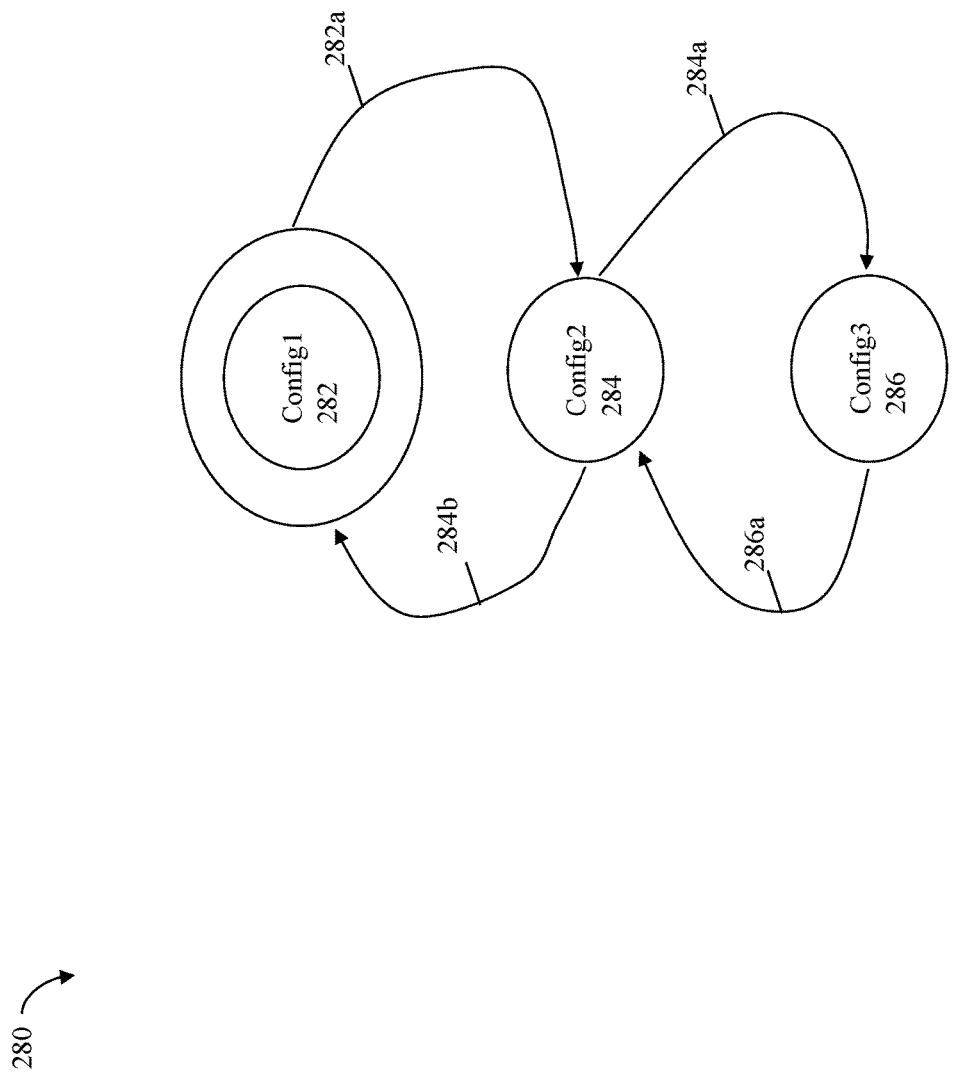

Referring to FIG. 9A, shown is a state transition diagram summarizing the transitions between the 3 predetermined configurations as described above in connection with the FIGS. 6, 7 and 8. Each predetermined configuration may include a predetermined zoning configuration and an associated predetermined set of masking information. Each of the predetermined configurations may be a state represented by a node in the diagram 280. The diagram 280 includes 3 nodes: 282 representing predetermined configuration 1 (e.g., FIG. 6); 284 representing predetermined configuration 2 (e.g., FIG. 7); and 286 representing predetermined configuration 3 (e.g., FIG. 8). In this example the starting activated configuration is 282. The transitions between the states are denoted by directed arrows. When in one of the states, selection criteria specifies when to transition and thus activate a different configuration. The active configuration of the switch may transition 282a from the configuration 1 282 to the configuration 2 284 such as described in connection with the FIGS. 6 and 7. The active configuration of the switch may transition 284a from the configuration 2 284 to the configuration 3 286, such as described in connection with the FIGS. 7 and 8.

Additionally, an embodiment may also specify selection criteria of when to transition 286a from the configuration 3 286 to the configuration 2 284; and when to transition 284b from the configuration 2 284 to the configuration 1 282. These last 2 transitions—286a and 284b—are described in more detail below and may occur as the workload of the various ports and paths decreases from its peak workload conditions as described in connection with the third predetermined configuration (e.g., 286) of FIG. 8.

Referring to FIG. 9B, shown is an example 250 summarizing the various predetermined configurations and selection criteria that may be used in an embodiment in accordance with the techniques herein. The example 250 provides a table summarizing such information as described in connection with the example illustrated in connection with the FIGS. 6, 7, 8 and 9A with the 3 predetermined configurations where each such configuration includes a predetermined zoning configuration, a set of predetermined masking information and selection criteria indicating when to transition into the configuration.

The table 250 includes 4 columns: configuration identifier (config ID) 252, selection criteria 254, zoning configuration 256, and masking information 258. Each row of the table 250 specifies information of a different one of the predetermined configurations.

Row 260 includes information of the first predetermined configuration, config 1, having selection criteria 262a and 262b. Element 262a indicates that the first predetermined configuration is the initial or starting activated configuration for the SAN. Element 256a indicates that the first predetermined configuration has a zoning configuration with 2 paths A2-B3 and A3-B3 as in the FIG. 6. Element 258a indicates that the first predetermined configuration has masking information that corresponds to the zoning configuration 256a. The element 258a matches the masking information 210 of FIG. 6. The element 262b indicates selection criteria corresponding to the transition 284b of the FIG. 9A specifying when to transition from the second predetermined configuration (as the activated configuration) to the first predetermined configuration. The element 262b indicates that, if the second predetermined configuration is activated, transition to or activate the first predetermined configuration when the utilization workload of each the target ports B3 and B2 is below 60%.

Row 262 includes information of the second predetermined configuration, config 2, having selection criteria 263a and 263b. Element 264a indicates selection criteria corresponding to 282a of FIG. 9A of when to transition from the first predetermined configuration as the activated configuration to the second predetermined configuration as the active configuration. Element 264a indicates that, if the first predetermined configuration is activated, transition to or activate the second predetermined configuration when the utilization workload of the target port B3 is equal to or greater than 70%. Element 256b indicates that the second predetermined configuration has a zoning configuration with 2 paths A2-B2 and A3-B3 as in the FIG. 7. Elements 265a and 265b indicate that the second predetermined configuration has masking information that corresponds to the zoning configuration 256b. The elements 265a and 265b match the masking information 221 of FIG. 7. The element 264b indicates selection criteria corresponding to the transition 286a of the FIG. 9A specifying when to transition from the third predetermined configuration (as the activated configuration) to the second predetermined configuration. The element 264b indicates that, if the third predetermined configuration is activated, transition to or activate the second predetermined configuration when the utilization workload of each the target ports B1, B2 and B3 fall below 60%.

Row 264 includes information of the third predetermined configuration, config 3, having selection criteria 263a. Element 263a indicates selection criteria corresponding to 284a of FIG. 9A of when to transition from the second predetermined configuration as the activated configuration to the third predetermined configuration as the active configuration. Element 263a indicates that, if the second predetermined configuration is activated, transition to or activate the third predetermined configuration when the utilization workload each of the target ports B2 and B3 is equal to or greater than 70%. Element 256c indicates that the second predetermined configuration has a zoning configuration with 3 paths A1-B1, A2-B2 and A3-B3 as in the FIG. 8. Elements 267a-c indicate that the third predetermined configuration has masking information that corresponds to the zoning configuration 256c. The elements 267a-c match the masking information 241 of FIG. 8.

It should be noted that the utilization threshold of 60% is specified in connection with downward transitions when current workloads of the SAN decrease, and that a different threshold of 70% is used when transitioning to configurations when current workloads of the SAN increase. The foregoing different thresholds may be used to prevent or reduce thrashing between different activated configurations that may occur when using the same utilization threshold for all transitions. An embodiment may use other techniques to reduce or eliminate thrashing or continuously transitioning between different activated configurations.

Another condition that, when detected, may be cause for redistributing or shifting workload is an unbalanced workload. In one embodiment, it may be a goal or desire to have an approximately equal workload (within a specified threshold or tolerance) across the data storage system. Such a determination may be made with respect to any of target ports and HAs (e.g., front end adapters of the data storage system each including one or more target ports), or more generally, front end components of the data storage system. For example, whether workload of the data storage system is balanced may be made with respect to target ports that are currently zoned and masked for use by at least one initiator for at least one LUN or SG.

Whether the workload is balanced may be determined with respect to one or more rebalancing criteria. For example, such criteria may include a specified threshold or tolerance denoting an acceptable level of difference or variation between observed workloads of the different target ports. To further illustrate with the current example using target ports B1 and B2, if the difference in workload between the two target ports exceeds the specified threshold or tolerance, then the current workload of the data storage system may be considered unbalanced and require redistribution to further more equally partition the workload between the two target ports B1 and B2. As a variation, if there were more than 2 target ports under consideration for workload balancing, an average workload across the target ports may be determined and the specified threshold may denote a difference from the average whereby if the observed workload of the target port is outside the range denoted by the average +/− threshold, the observed workload may be considered out of balance and workload may be shifted to the target port (e.g., if observed workload is less than average − threshold) or may be shifted from the target port (e.g., if observed workload is less than average + threshold). It should be noted that the threshold denoting an acceptable level of difference or variation with respect to the multiple ports under consideration may be identified in any suitable manner. For example, the threshold denoting an acceptable level of difference or variation may be specified as a number of standard deviations from the mean or average observed workload, may be expressed as a percentage of the mean or average workload, and the like.

Figure 11:
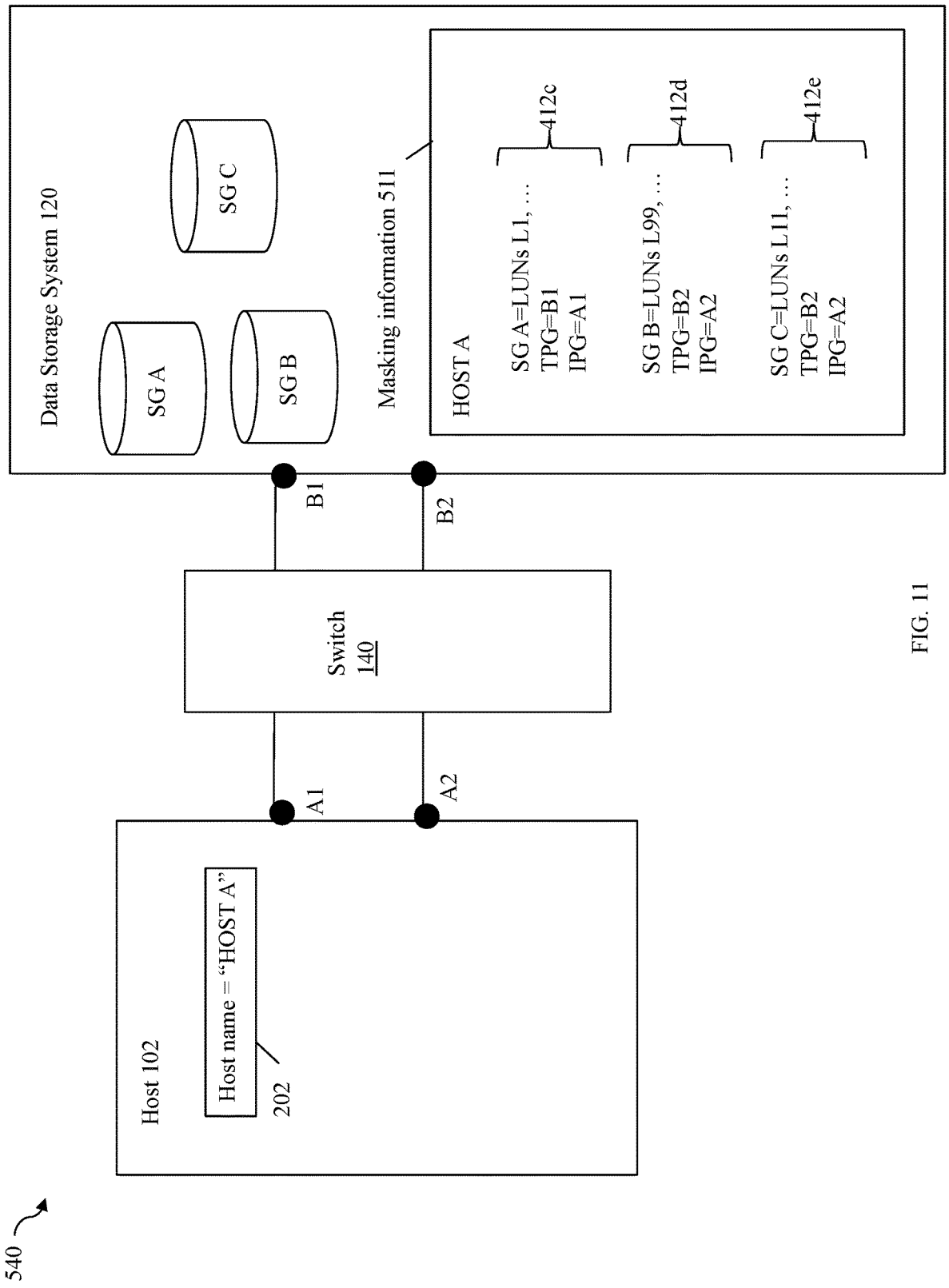

Described in following paragraphs is another example illustrating use of techniques herein in connection with rebalancing to achieve a balanced workload. The following example is described with reference to FIGS. 10, 11, 12A and 12B. The example uses two predetermined configurations including a fourth predetermined configuration, configuration 4 (config 4), illustrated in FIG. 10 that includes a fourth predetermined zoning configuration and a fourth set of predetermined masking information; and including a fifth predetermined configuration, configuration 5 (config 5)

illustrated in FIG. 11 that includes a fifth predetermined zoning configuration and a fifth set of predetermined masking information.

The fourth and fifth predetermined zoning configurations may be loaded into the switch 140 and the fourth predetermined zoning configuration and its associated fourth set of predetermined masking information may be activated as the current configuration.

Figure 10:
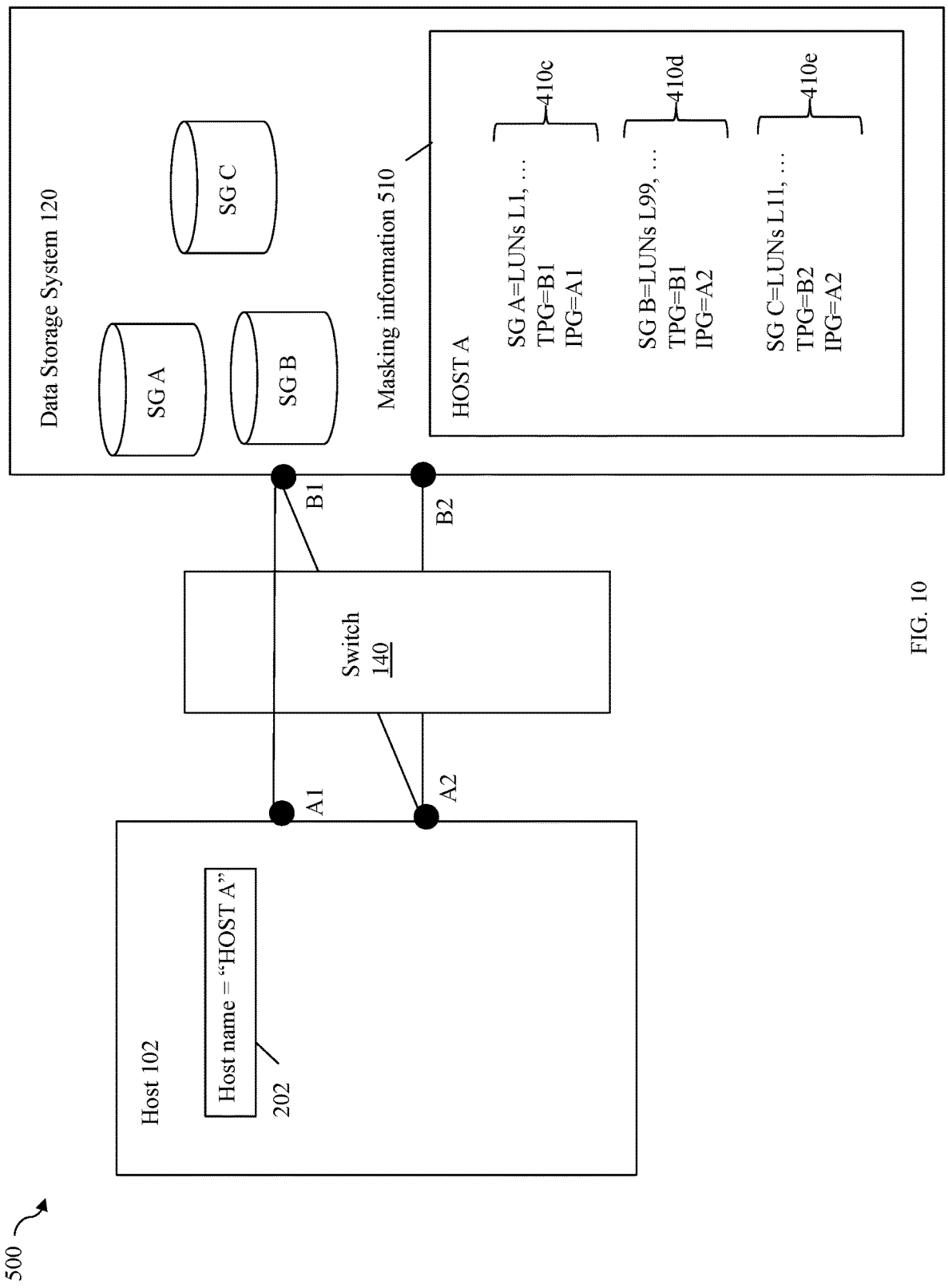

In connection with the illustrating use of techniques herein in connection with rebalancing to achieve a balanced workload, reference is made to FIG. 10 illustrating the starting activated configuration in an embodiment in accordance with the techniques herein at a first point in time.

The example 500 of FIG. 10 includes the host 102 and data storage system 120 as described elsewhere herein with only active configured paths of the switch illustrated. In the example 500, the data storage system 120 is configured with 3 SGs of LUNs—SG A, SG B and SG C. The switch 140 is configured in the activated configuration 4 of FIG. 10 with the fourth predetermined zoning configuration to have the following paths: A1-B1, A2-B1 and A2-B2. The masking information 510 may be the associated fourth set of predetermined masking information including the masking information 410c for SG A, 410d for SG B, and 410e for SG C. Element 410c indicates that I/Os directed to the LUNs of SG A are sent over the path A1-B1. Element 410d indicates that I/Os directed to the LUNs of SG B are sent over the path A2-B1. Element 410e indicates that I/Os directed to the LUNs of SG C are sent over the path A2-B2.

In this example with reference to FIG. 10 at the first point in time, the observed workload W1 (denoting the sum or aggregate workload for SG A and SG B) for target port B1 may be approximately the same as the observed workload W2 (denoting the workload for SG C) for target port B2. At the first point in time, assume the following workloads for each of the LUNs:

| workload | SG |
| --- | --- |
| 100 IOPS | SG A |
| 100 IOPS | SG B |
| 200 IOPS | SG C |

At this first point in time, the observed workloads for target port B1=200 IOPS and for target port B2=200 TOPS and the current workload in the data storage system may be determined as balanced.

At a second later point in time, the total workload (e.g., in terms of I/Os per second and/or MBps) from A1-B1 directed to SG A greatly increases, the total workload from A1-B3 directed to SG C greatly decreases and the total workload from A2-B1 directed to SG B also greatly increases. To further illustrate, at the second point in time, assume the following workloads for each of the LUNs:

| workload | SG |
| --- | --- |
| 500 IOPS | SG A |
| 500 IOPS | SG B |
| 2 IOPS | SG C |

At this second point in time, the observed workloads for target port B1=1000 TOPS and for target port B2=2 IOPS and may be considered unbalanced since the difference in workloads between the 2 target ports exceeds a specified maximum difference threshold. Thus, processing may be performed to attempt to rebalance the existing workload across the target ports B1 and B2. In connection with this example having the connectivity information as in FIG. 10, processing may be performed in an embodiment in accordance with techniques herein to shift or redistribute the workload across target ports B1 and B2 by selecting and activating another predetermined configuration having selection criteria matching the current workload conditions of the configuration noted above at the second point in time.

Continuing with the example, in response to detecting the observed workloads of the target ports Bland B2 are unbalanced, processing may be performed to select and activate the fifth predetermined zoning configuration having associated selection criteria matching the current unbalanced state conditions of the target ports B1 and B2. In this example, the fifth predetermined zoning configuration loaded into the switch may define an alternate configuration of the switch 140 which redistributes the I/O workload of the host directed to SG B along the path A2-B2. The selection criteria associated with the fifth predetermined zoning configuration may specify to activate, or transition to, the fifth predetermined zoning configuration responsive to the current I/O workload of B1 and B2 being unbalanced, such as where the difference between the 2 workloads exceeds a specified maximum threshold denoting a maximum allowable difference. This further redistribution of SG B's I/O workload may be accomplished, for example, by eliminating the path A2-B1 and adjusting the masking information to have the workload for SG B flow through the path B2-B2.

With reference to FIG. 11 illustrating the fifth predetermined zoning configuration, the switch 140 is configured to have 2 paths: A1-B1 and A2-B2 with the masking information 511 denoting the fifth set of predetermined masking information. The masking information 511 includes elements 412c-e. Element 412c describes the masking information for SG A and indicates that I/Os directed to the LUNs of SG A are sent over the path A1-B1. Element 412d describes the masking information for SG B and indicates that I/Os directed to the LUNs of SG B are sent over the path A2-B2. Element 412e describes the masking information for SG C and indicates that I/Os directed to the LUNs of SG C are sent over the path A2-B2. Thus the fifth configuration of FIG. 11 as compared to the fourth configuration of FIG. 10 shifts the workload of SG B from the target port B1 to the target port B2 (over path A2-B2) having available bandwidth to create a more balanced I/O workload with respect to the target ports B1 and B2.

As discussed elsewhere herein, in response to activating the fifth predetermined zoning configuration in the switch 140 of the FIG. 11, the switch may notify the host of the change in active zoning configuration, and the host may perform discovery processing such as by issuing commands to the switch to obtain the zoning configuration of the activated third predetermined zoning configuration. The discovery processing may include, for example, the discovery of the additional removal of the path A2-B1.

Figure 12A:
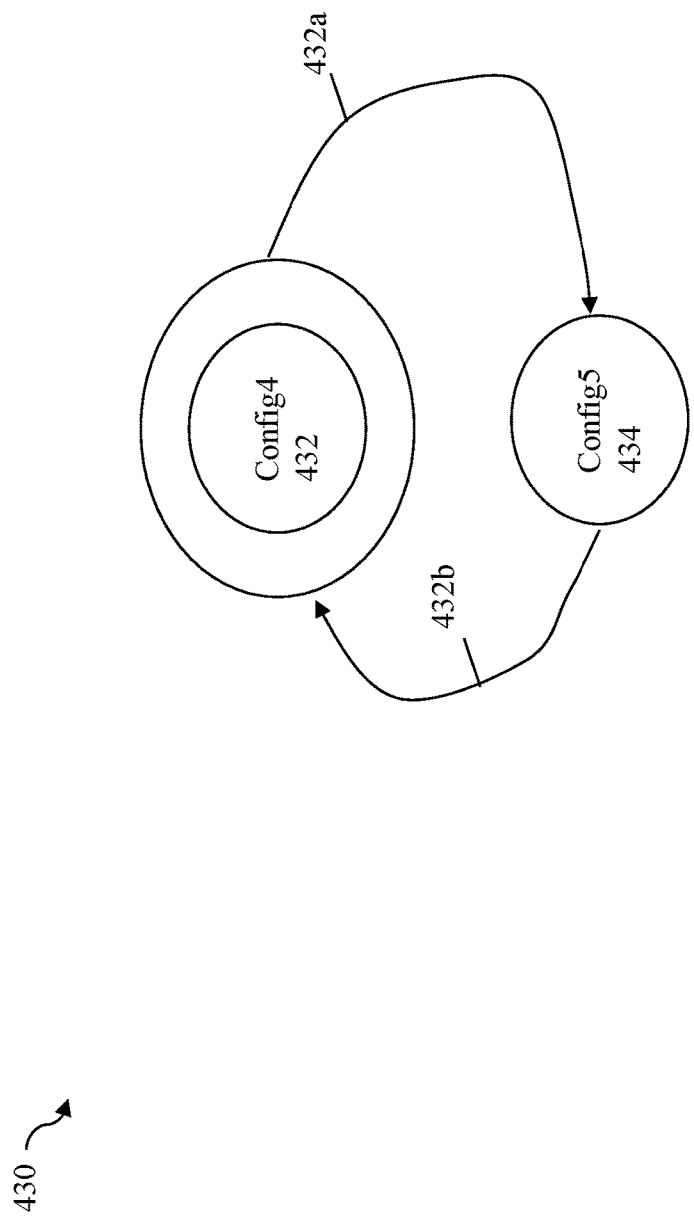

Referring to FIG. 12A, shown is a state transition diagram summarizing the transitions between the 2 predetermined configurations as described above in connection with the FIGS. 10 and 11. Each predetermined configuration may include a predetermined zoning configuration and an associated predetermined set of masking information. Each of the predetermined configurations may be a state represented by a node in the diagram 430. The diagram 430 includes 2 nodes: 432 representing predetermined configuration 4 (e.g., FIG. 10); and 434 representing predetermined configuration 5 (e.g., FIG. 11). In this example the starting activated configuration is 432. The transitions between the states are denoted by directed arrows. When in one of the states, selection criteria specifies when to transition and thus activate a different configuration. The active configuration of the switch may transition 432a from the configuration 4 432 to the configuration 5 434 such as described in connection with the FIGS. 10 and 11.

Additionally, an embodiment may also specify selection criteria of when to transition 432b from the configuration 5 434 to the configuration 4 432. The transition 432b is described in more detail below and may occur as the workload of the various ports and paths further changes from workload conditions as described in connection with the fifth predetermined configuration (e.g., 434) of FIG. 11.

Referring to FIG. 12B, shown is an example 400 summarizing the various predetermined configurations and selection criteria that may be used in an embodiment in accordance with the techniques herein. The example 400 provides a table summarizing such information as described in connection with the example illustrated in connection with the FIGS. 10, 11 and 12A with the 2 predetermined configurations where each such configuration includes a predetermined zoning configuration, a set of predetermined masking information and selection criteria indicating when to transition into the configuration.

The table 400 includes 4 columns: configuration identifier (config ID) 402, selection criteria 404, zoning configuration 406, and masking information 408. Each row of the table 400 specifies information of a different one of the predetermined configurations.

Row 410 includes information of the fourth predetermined configuration, config 4, having selection criteria 410a-b. Element 410a indicates that the fourth predetermined configuration is the initial or starting activated configuration for the SAN. Element 406a indicates that the fourth predetermined configuration has a zoning configuration with 3 paths A1-B1, A2-B1 and A2-B2 as in the FIG. 10. Elements 410c-e indicate that the fourth predetermined configuration has masking information that corresponds to the zoning configuration 406a and further refines or specifies control over the paths used for the workloads for the SGs and LUNs thereof. The elements 410c-e match the masking information 510 of FIG. 10. The element 410b indicates selection criteria corresponding to the transition 432b of the FIG. 12A specifying when to transition from the fifth predetermined configuration (as the activated configuration) to the fourth predetermined configuration. The element 410b indicates that, if the fifth predetermined configuration is activated, transition to or activate the fourth predetermined configuration when the difference (B2 workload-B1 workload) is greater than a maximum allowable threshold or difference, MAX DIFF.

Row 412 includes information of the fifth predetermined configuration, config 5, having selection criteria 412a. The element 412a indicates selection criteria corresponding to the transition 432a of the FIG. 12A specifying when to transition from the fourth predetermined configuration (as the activated configuration) to the fifth predetermined configuration. The element 412a indicates that, if the fourth predetermined configuration is activated, transition to or activate the fifth predetermined configuration when the difference (B1 workload-B2 workload) is greater than a maximum allowable threshold or difference, MAX DIFF.

Element 406b indicates that the fifth predetermined configuration has a zoning configuration with 2 paths A1-B1 and A2-B2 as in the FIG. 11. Elements 412c-e indicate that the fifth predetermined configuration has masking information that corresponds to the zoning configuration 406b and further refines or specifies control over the paths used for the workloads for the SGs and LUNs thereof. The elements 412c-e match the masking information 511 of FIG. 11.

In at least one embodiment, use of techniques as described herein may be embodied in software or executing code, such as a tool and software that executes on the data storage system. The tool may collect workload information regarding the workload of the various front end components such as target ports and HAs of the data storage system. The workload information may be I/O workload information expressed in one or more suitable I/O statistics or metrics (e.g., IOPS, MBps) such as mentioned elsewhere herein. Another workload metric that may be obtained and used in connection with techniques herein is utilization. Utilization may be expressed as a percentage with respect to a component's maximum capacity or capability (e.g., saturation point) For example, as mentioned elsewhere herein, a target port may have a maximum workload capacity (e.g., such as expressed in terms of TOPS, MBps, and the like) where the foregoing denotes 100% utilization of the target port. If a current workload for the target port is 50 TOPS and the maximum workload capacity for the target port is 100 TOPS, the target port may be at 50% utilization. In a similar manner, a single HA may have a maximum workload capacity (e.g., such as expressed in terms of IOPS, MBps, and the like) where the foregoing denotes 100% utilization of the HA. If a current workload for the HA (as determined based on the aggregate workload of all its target ports) is 500 TOPS and the maximum workload capacity for the target port is 1000 IOPS, the HA may be at 50% utilization. As mentioned elsewhere herein, a threshold denoting a maximum or acceptable upper bound regarding workload may be specified per target port and also per HA.

The tool may collect performance information regarding I/O performance such as with respect to I/Os that are received at a particular target port, particular HA, per LUN, and/or per initiator. The performance information may include any one or more suitable performance metrics or statistics such as average response time (RT) for an I/O. It should be noted that workload and/or performance information may be obtained at varying levels of granularity (e.g., such as what is the workload and performance with respect to I/Os of a LUN at each target port/on a per target port basis; or what is the workload and performance with respect to I/Os of a LUN sent from a particular initiator at each target port/on a per target port basis).

The tool may receive information regarding the current state of the data storage system, such as observed current I/O workload and/or performance information. In at least one embodiment, the tool may provide such inputs received regarding current I/O workload and/or performance information for the SAN to other software executing on the data storage system. The other software on the data storage system may use such inputs, for example, in determining whether selection criteria associated with a different predetermined configuration (other than a currently activated configuration) is met. If the selection criteria associated with a first predetermined configuration is met, the first predetermined configuration may be activated. Such activation may include sending a command from the data storage system to the switch to activate a predetermined zoning configuration of the selected first predetermined configuration. Such activation may include activating a set of predetermined masking information associated with the first predetermined configuration. The selection criteria may indicate to activate a different predetermined configuration, for example, if workload is unbalanced, if workload of a component is overloaded, if performance is unacceptable, and the like. For example, a different predetermined configuration may be activated if it is determined that a target port or HA is overloaded with a currently active configuration, and/or I/O performance (such as for a particular LUN) is less than a specified performance threshold with a currently active configuration.

Examples of I/O workload and/or performance information that may be obtained for use with the techniques herein are described herein. Such information may relate to the front end components of the data storage system. Such information may be collected, for example, per target port, per HA, regarding individual LUNs on each of the various target ports over which such LUNs are accessible, per SG, per path, and the like. The I/O workload and/or performance information collected may be used as an input into decision making in deciding whether to specified selection criteria is met and whether to activate a different predetermined configuration due to unbalanced workload distribution on the data storage system, overloaded component(s), and the like.

It should be noted that the performance and workload information may include collecting various statistics or indicators some of which are described herein. For example, an embodiment may collect one or more key performance indicators (KPIs) such as KPIs per HA port and KPIs per HA (e.g., I/Os per second per port, MB per second per port, HA CPU load (32 ports in an HA therefore load for the entire FA considers one or more KPIs for all 32 ports)). The KPIs may also be collected per logical device (e.g., per LUN) on a particular HA port (e.g., I/Os per second directed to a particular LUN at a particular HA port, MBs per second directed to a particular LUN at a particular HA port, in order to denote how much load/work each LUN contributes to the overall port workload). An embodiment may also collect information on other KPIs, such as, for example, any one or more of: average I/O size per LUN, and overall average I/O latency (e.g., I/Os sometimes take longer because such I/O may be sent to a remotely located data storage system which therefore increase the overall I/O latency on a particular HA port). An embodiment may generally use any one or more suitable KPIs such as one or more of the foregoing as well as other described herein.

An embodiment may perform processing using the techniques herein to determine if the workload distribution is balanced across the data storage system based on current workload conditions. Such a determination may be made with respect HAs, target ports and/or LUNs. Some examples are provided elsewhere herein such as with respect to workload balancing across target ports and/or HAs. For example, it may be a goal of workload balancing and distribution to have approximately (e.g., within a specified threshold) the same workload and/or performance (e.g., such as with respect to average I/O RT) on all HAs and across all FA ports. If not, then processing may be performed to try and achieve this goal by relocating load from a busy HA or target port having a high workload to an idle or less busy HA or target port. Such relocation or redistribution may be performed automatically using techniques as described elsewhere herein by automatically selecting and activating various predetermined configurations responsive to changes in workloads and/or performance over time.

An embodiment in accordance with techniques herein may periodically (e.g., such at every occurrence of a specified amount of time) perform processing as described herein to determine whether to activate a different predetermined configuration due to workload imbalances, overloaded components, and/or performance goals not being met.

It should be noted that the tool or other software embodying techniques described herein may be located on the data storage system, or at another suitable location or component external to the data storage system so long as the appropriate information can be collected to perform the analysis and processing as described herein.

Although the non-limiting examples described herein to illustrate use of the techniques may have a particular number of predetermined configurations, more generally, an embodiment may use any suitable number of predetermined configurations, such generally two or more predetermined configurations. Thus, an embodiment in accordance with the techniques herein may generally load the switch with two or more predetermined zoning configurations and may have on the data storage system two or more predetermined sets of masking information (e.g., one associated set of masking information for each of the predetermined zoning configurations where a predetermined zoning configuration is activated along with its associated set of masking information).

Figure 13A:
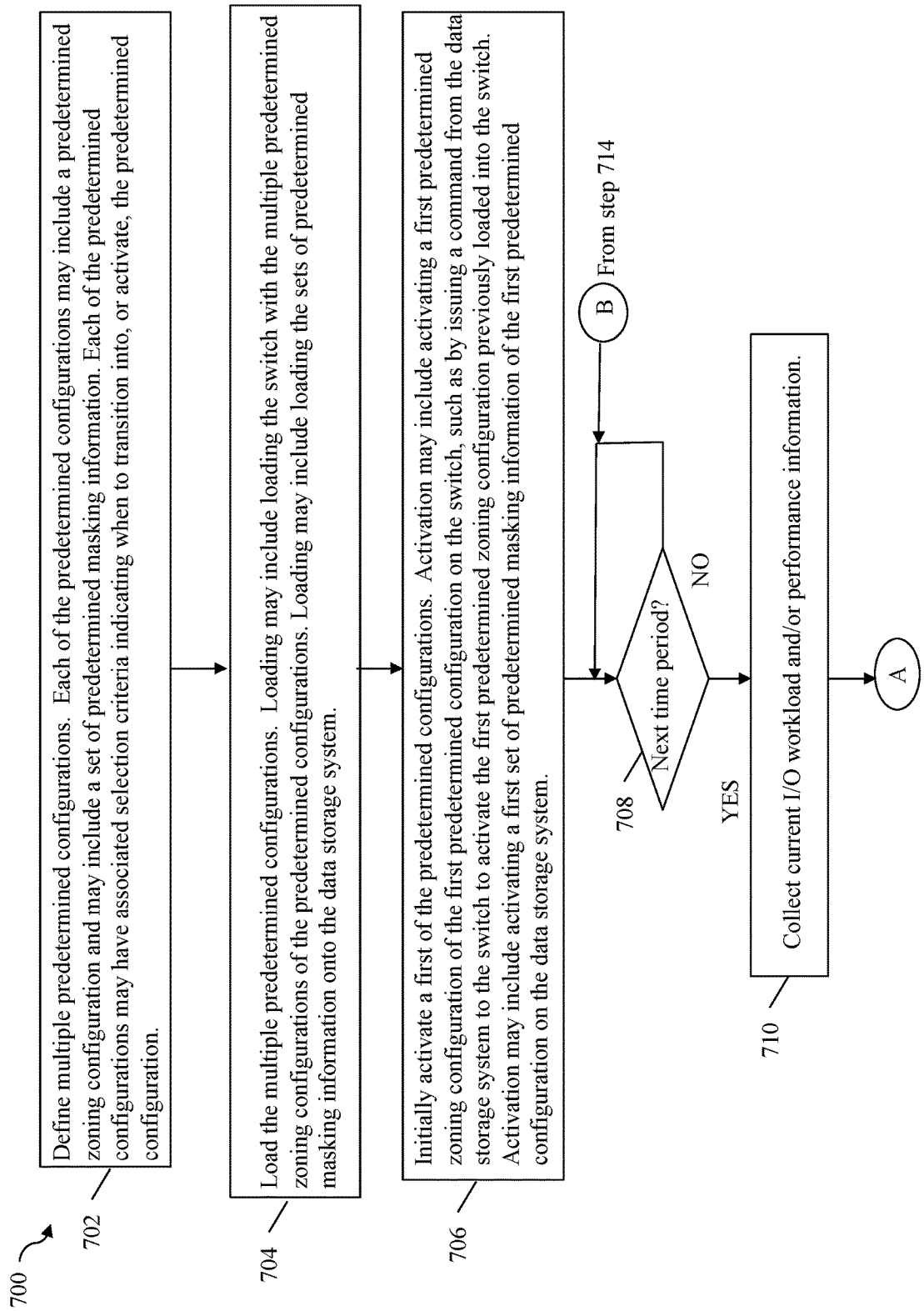
FIGS. 13A and 13B are flowcharts of processing steps that may be performed in an embodiment in accordance with the techniques herein.
Figure 13B:
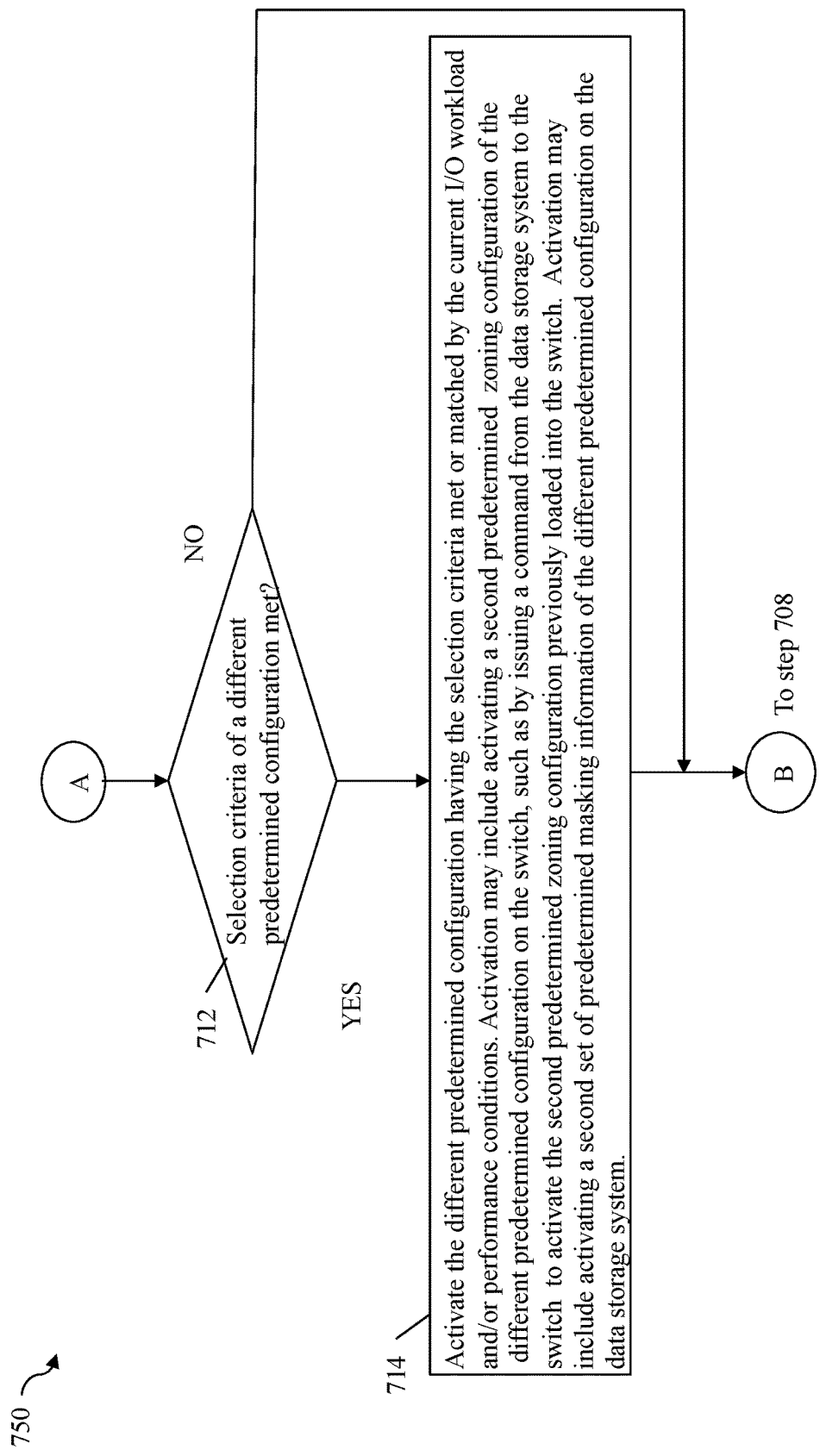

Referring to FIGS. 13A and 13B, shown are flowcharts of processing steps that may be performed in an embodiment in accordance with the techniques herein. The flowcharts 700 and 750 summarize processing described above.

At the step 702, multiple predetermined configurations may be defined. Each of the predetermined configurations may include a predetermined zoning configuration and may include a set of predetermined masking information. Each of the predetermined configurations may have associated selection criteria indicating when to transition into, or activate, the predetermined configuration. From the step 702, control proceeds to the step 704.

At the step 704, processing may be performed to load the multiple predetermined configurations. Loading in the step 704 may include loading the switch with the multiple predetermined zoning configurations of the predetermined configurations. Loading in the step 704 may include loading the sets of predetermined masking information onto the data storage system. From the step 704, control proceeds to the step 706.

At the step 706, processing is performed to initially activate a first of the predetermined configurations. Activation in the step 706 may include activating a first predetermined zoning configuration of the first predetermined configuration on the switch, such as by issuing a command from the data storage system to the switch to activate the first predetermined zoning configuration previously loaded into the switch. Activation in the step 706 may include activating a first set of predetermined masking information of the first predetermined configuration on the data storage system. From the step 706, control proceeds to the step 708.

At the step 708, processing is performed to determine whether the next time period has elapse denoting the next time period at which current I/O workload and/or performance information is collected and evaluated. If the step 708 evaluates to no, control remains at the step 708. If the step 708 evaluates to yes, control proceeds to the step 710 to collect the next set of current I/O workload and/or performance information. From the step 710, control proceeds to the step 712.

At the step 712, a determination is made as to whether the current I/O workload and/or performance information collected for the most recent time period meets selection criteria of a different predetermined configuration. As described herein, the various selection criteria of the multiple predetermined configurations may identify multiple workload and/or performance scenarios such as related to various scenarios of overloaded components and/or uneven workload distribution among components. As the current workload and/or performance conditions of the SAN change over time matching or meeting different selection criteria of different predetermined configurations, the particular predetermined configuration associated with the matched selection criteria may be selected and activated. If the step 712 evaluates to no, control proceeds to the step 708. If the step 712 evaluates to yes, control proceeds to the step 714.

At the step 714, processing is performed to activate the different predetermined configuration having the selection criteria that is met or matched by the current I/O workload and/or performance conditions. Activation in the step 714 may include activating a second predetermined zoning configuration of the different predetermined configuration on the switch, such as by issuing a command from the data storage system to the switch to activate the second predetermined zoning configuration previously loaded into the switch. Activation in the step 71 may include activating a second set of predetermined masking information of the different predetermined configuration on the data storage system. From the step 714, control proceeds to the step 708.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of determining connectivity comprising:
    defining a plurality of predetermined configurations, wherein each of the plurality of predetermined configurations includes a predetermined zoning configuration of a network and includes selection criteria indicating when to transition into and activate said each predetermined configuration, wherein the network includes an initiator set of one or more initiator ports and a target set of one or more target ports;
    loading the plurality of predetermined configurations;
    activating a first of the plurality of predetermined configurations that includes a first predetermined zoning configuration and first selection criteria;
    receiving current I/O workload and/or performance information for the network;
    determining whether the current I/O workload and/or performance information for the network matches second selection criteria associated with a second of the plurality of predetermined configurations that is different from the first predetermined configuration currently activated; and
    responsive to determining the current I/O workload and/or performance information matches the second selection criteria, activating the second predetermined configuration that is different from the first predetermined configuration currently activated.

2. The method of claim 1, wherein the network is a storage area network.

3. The method of claim 1, wherein the network includes a switch.

4. The method of claim 3, wherein said loading includes loading a plurality of predetermined zoning configurations of the plurality of predetermined configurations into the switch.

5. The method of claim 4, wherein said activating the first predetermined configuration includes issuing a first command to the switch to activate the first predetermined zoning configuration.

6. The method of claim 5, wherein the first predetermined configuration includes first predetermined masking information, and wherein said activating the first predetermined configuration includes activating the first predetermined masking information for use on a data storage system connected to the network.

7. The method of claim 6, wherein the data storage system includes at least some target ports of the target set.

8. The method of claim 7, wherein the second selection criteria includes at least one metric regarding workload of one or more components including any of a target port of the data storage system, an initiator port of a host, a front end adapter of the data storage system, a storage group of one or more storage devices of the data storage system, a path between an initiator port and a target port.

9. The method of claim 8, wherein the second selection criteria includes criteria identifying when the one or more components are considered overloaded having a current workload exceeding a specified threshold.

10. The method of claim 8, wherein the one or more components includes a plurality of components, and wherein the second selection criteria includes criteria identifying when the plurality of components are considered to have unbalanced workloads thereby requiring redistribution.

11. The method of claim 7, wherein said activating the second predetermined configuration includes issuing a second command to the switch to activate the second predetermined zoning configuration.

12. The method of claim 11, wherein the second predetermined configuration includes second predetermined masking information, and wherein said activating the second predetermined configuration includes activating the second predetermined masking information for use on the data storage system connected to the network.

13. A system comprising:
    one or more processors; and
    at least one memory comprising code stored thereon that, when executed, performs a method of determining connectivity comprising:
        defining a plurality of predetermined configurations, wherein each of the plurality of predetermined configurations includes a predetermined zoning configuration of a network and includes selection criteria indicating when to transition into and activate said each predetermined configuration, wherein the network includes an initiator set of one or more initiator ports and a target set of one or more target ports;
        loading the plurality of predetermined configurations;
        activating a first of the plurality of predetermined configurations that includes a first predetermined zoning configuration and first selection criteria;
        receiving current I/O workload and/or performance information for the network;
        determining whether the current I/O workload and/or performance information for the network matches second selection criteria associated with a second of the plurality of predetermined configurations that is different from the first predetermined configuration currently activated; and responsive to determining the current I/O workload and/or performance information matches the second selection criteria, activating the second predetermined configuration that is different from the first predetermined configuration currently activated.

14. A non-transitory computer readable medium comprising code stored thereon that, when executed, performs a method of determining connectivity comprising:

defining a plurality of predetermined configurations, wherein each of the plurality of predetermined configurations includes a predetermined zoning configuration of a network and includes selection criteria indicating when to transition into and activate said each predetermined configuration, wherein the network includes an initiator set of one or more initiator ports and a target set of one or more target ports;

loading the plurality of predetermined configurations;

activating a first of the plurality of predetermined configurations that includes a first predetermined zoning configuration and first selection criteria;

receiving current I/O workload and/or performance information for the network;

determining whether the current I/O workload and/or performance information for the network matches second selection criteria associated with a second of the plurality of predetermined configurations that is different from the first predetermined configuration currently activated; and responsive to determining the current I/O workload and/or performance information matches the second selection criteria, activating the second predetermined configuration that is different from the first predetermined configuration currently activated.

15. The non-transitory computer readable medium of claim 14, wherein the network is a storage area network.

16. The non-transitory computer readable medium of claim 14, wherein the network includes a switch.

17. The non-transitory computer readable medium of claim 16, wherein said loading includes loading a plurality of predetermined zoning configurations of the plurality of predetermined configurations into the switch.

18. The non-transitory computer readable medium of claim 17, wherein said activating the first predetermined configuration includes issuing a first command to the switch to activate the first predetermined zoning configuration.

19. The non-transitory computer readable medium of claim 18, wherein the first predetermined configuration includes first predetermined masking information, and wherein said activating the first predetermined configuration includes activating the first predetermined masking information for use on a data storage system connected to the network.

20. The non-transitory computer readable medium of claim 19, wherein the data storage system includes at least some target ports of the target set.

* * * * *